US011077556B2

(12) United States Patent
Dalley et al.

(10) Patent No.: US 11,077,556 B2
(45) Date of Patent: Aug. 3, 2021

(54) SAFETY MONITORING AND CONTROL SYSTEM AND METHODS FOR A LEGGED MOBILITY EXOSKELETON DEVICE

(71) Applicant: Parker-Hannifin Corporation, Cleveland, OH (US)

(72) Inventors: Skyler Ashton Dalley, Shaker Heights, OH (US); Ryan Farris, Hartville, OH (US); Steven Etheridge, Tallmadge, OH (US); Scott Morrison, Mount Pleasant, MI (US); Spencer Murray, University Heights, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 406 days.

(21) Appl. No.: 15/743,143

(22) PCT Filed: Nov. 18, 2016

(86) PCT No.: PCT/US2016/062726
§ 371 (c)(1),
(2) Date: Jan. 9, 2018

(87) PCT Pub. No.: WO2017/105762
PCT Pub. Date: Jun. 22, 2017

(65) Prior Publication Data
US 2019/0105777 A1    Apr. 11, 2019

Related U.S. Application Data

(60) Provisional application No. 62/266,840, filed on Dec. 14, 2015.

(51) Int. Cl.
*B25J 9/16*    (2006.01)
*A61H 3/00*    (2006.01)
(Continued)

(52) U.S. Cl.
CPC .............. *B25J 9/1674* (2013.01); *A61H 3/00* (2013.01); *B25J 9/0006* (2013.01); *B25J 9/1615* (2013.01);
(Continued)

(58) Field of Classification Search
CPC ...................................................... A61H 3/00
See application file for complete search history.

(56) References Cited

U.S. PATENT DOCUMENTS 8,096,965 B2    1/2012  Goffer et al.
10,537,488 B2 * 1/2020  Farris ................... A61H 1/0244
(Continued)

FOREIGN PATENT DOCUMENTS

JP    2011-115323 A    6/2011
JP     5 507224 B2     5/2014
(Continued)

OTHER PUBLICATIONS

International Search Report and Written Opinion for corresponding Patent Application No. PCT/US2016/062726 dated Mar. 20, 2017.

*Primary Examiner* — Jacqueline Woznicki
(74) *Attorney, Agent, or Firm* — Renner, Otto, Boisselle & Sklar, LLP

(57) ABSTRACT

A method of controlling a mobility device and related device including at least one drive component that drives at least one joint component is described. The control method may include executing a control application with an electronic controller to perform: receiving sensor information from sensors corresponding to a state and/or mode of the mobility device; analyzing the sensor information and determining a control mode of operation based on the sensor information; generating a control signal to output an alert via electronic indicators corresponding to the determined control mode; and controlling at least one drive component of the mobility
(Continued)

device to selectively configure and modulate at least one joint component in accordance with the determined control mode of operation. Different alerts may be outputted by the electronic indicators depending on the nature or severity of the alert condition, accompanied by respective device control operations in accordance with the alert condition.

11 Claims, 15 Drawing Sheets

(51) Int. Cl.
    *B25J 9/00*     (2006.01)
    *A61H 1/02*     (2006.01)

(52) U.S. Cl.
    CPC ...... *A61H 1/024* (2013.01); *A61H 2201/5058* (2013.01); *G05B 2219/23172* (2013.01); *G05B 2219/40305* (2013.01)

(56) References Cited

U.S. PATENT DOCUMENTS

| | | | |
|---|---|---|---|
| 2006/0167564 A1* | 7/2006 | Flaherty | A61B 5/0476 623/57 |
| 2008/0211302 A1* | 9/2008 | Hirota | B25J 13/02 307/1 |
| 2010/0094188 A1 | 4/2010 | Goffer et al. | |
| 2010/0268351 A1* | 10/2010 | van der Merwe | A61F 2/68 623/24 |
| 2012/0226365 A1* | 9/2012 | Seyr | A61F 2/64 623/24 |
| 2013/0040783 A1 | 2/2013 | Duda et al. | |
| 2013/0197408 A1* | 8/2013 | Goldfarb | A61F 5/0102 601/35 |
| 2015/0025423 A1* | 1/2015 | Caires | A61H 1/024 601/35 |
| 2016/0045386 A1* | 2/2016 | Sandler | A61B 5/6811 623/24 |
| 2016/0253890 A1* | 9/2016 | Rabinowitz | A61H 1/02 340/539.13 |
| 2019/0070059 A1* | 3/2019 | Dalley | A61H 3/00 |
| 2020/0060921 A1* | 2/2020 | Dalley | A61H 3/008 |

FOREIGN PATENT DOCUMENTS

| | | |
|---|---|---|
| WO | 2010/044087 | 4/2010 |
| WO | 2012/044621 | 4/2012 |
| WO | 2013/142777 | 9/2013 |
| WO | 2014/036138 A1 | 3/2014 |
| WO | 2014/159577 A1 | 10/2014 |
| WO | 2015/006853 A1 | 1/2015 |
| WO | 2015/063765 A1 | 5/2015 |

* cited by examiner

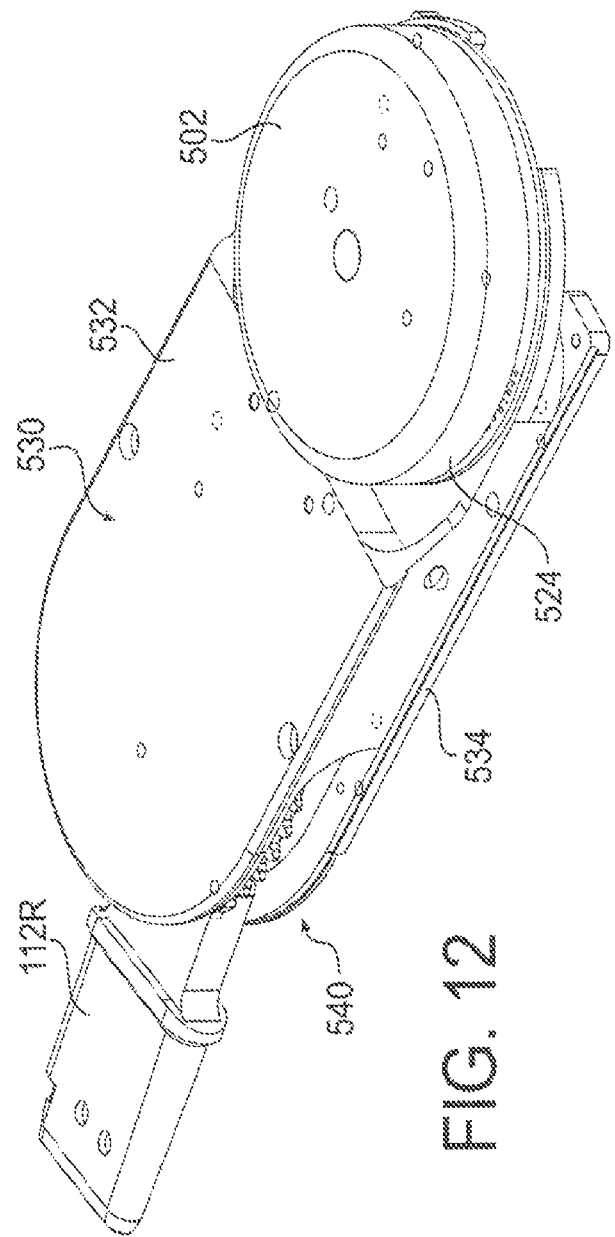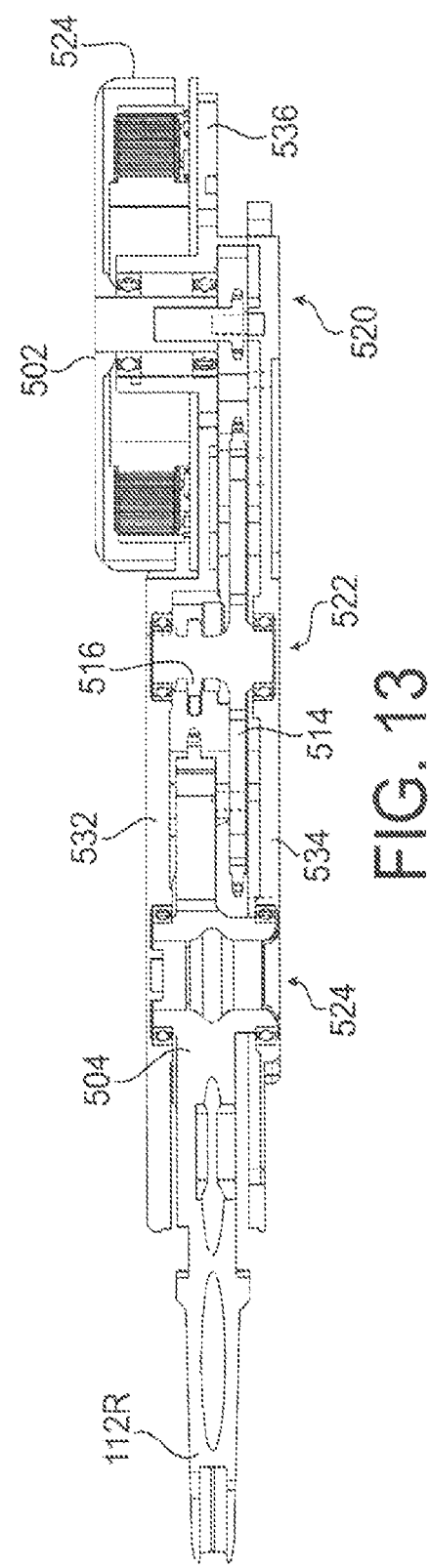

SAFETY MONITORING AND CONTROL SYSTEM AND METHODS FOR A LEGGED MOBILITY EXOSKELETON DEVICE

RELATED APPLICATIONS

This application is national stage application pursuant to 35 U.S.C. § 371 of PCT/US2016/062726 filed on Nov. 18, 2016, which claims the benefit of U.S. Provisional Application No. 62/266,840 filed Dec. 14, 2015, the contents of which are incorporated herein by reference.

FIELD OF INVENTION

The present invention relates to electronic control systems for a legged mobility device or "exoskeleton" device, including control systems for safety monitoring of the operation of the legged mobility device or exoskeleton device.

BACKGROUND OF THE INVENTION

There are currently on the order of several hundred thousand spinal cord injured (SCI) individuals in the United States, with roughly 12,000 new injuries sustained each year at an average age of injury of 40.2 years. Of these, approximately 44% (approximately 5300 cases per year) result in paraplegia. One of the most significant impairments resulting from paraplegia is the loss of mobility, particularly given the relatively young age at which such injuries occur. Surveys of users with paraplegia indicate that mobility concerns are among the most prevalent, and that chief among mobility desires is the ability to walk and stand. In addition to impaired mobility, the inability to stand and walk entails severe physiological effects, including muscular atrophy, loss of bone mineral content, frequent skin breakdown problems, increased incidence of urinary tract infection, muscle spasticity, impaired lymphatic and vascular circulation, impaired digestive operation, and reduced respiratory and cardiovascular capacities.

In an effort to restore some degree of legged mobility to individuals with paraplegia, several lower limb orthoses have been developed. The simplest form of such devices is passive orthotics with long-leg braces that incorporate a pair of ankle-foot orthoses (AFOs) to provide support at the ankles, which are coupled with leg braces that lock the knee joints in full extension. The hips are typically stabilized by the tension in the ligaments and musculature on the anterior aspect of the pelvis. Since almost all energy for movement is provided by the upper body, these passive orthoses require considerable upper body strength and a high level of physical exertion, and provide very slow walking speeds.

The hip guidance orthosis (HGO), which is a variation on long-leg braces, incorporates hip joints that rigidly resist hip adduction and abduction, and rigid shoe plates that provide increased center of gravity elevation at toe-off, thus enabling a greater degree of forward progression per stride. Another variation on the long-leg orthosis, the reciprocating gait orthosis (RGO), incorporates a kinematic constraint that links hip flexion of one leg with hip extension of the other, typically by means of a push-pull cable assembly. As with other passive orthoses, the user leans forward against a stability aid (e.g., bracing crutches or a walker) while un-weighting the swing leg and utilizing gravity to provide hip extension of the stance leg. Since motion of the hip joints is reciprocally coupled through the reciprocating mechanism, the gravity-induced hip extension also provides contralateral hip flexion (of the swing leg), such that the stride length of gait is increased. One variation on the RGO incorporates a hydraulic-circuit-based variable coupling between the left and right hip joints. Experiments with this variation indicate improved hip kinematics with the modulated hydraulic coupling.

To decrease the high level of exertion associated with passive orthoses, the use of powered orthoses has been under development, which incorporate actuators and drive motors associated with a power supply to assist with locomotion. These powered orthoses have been shown to increase gait speed and decrease compensatory motions, relative to walking without powered assistance.

The use of powered orthoses presents an opportunity for electronic control of the orthoses. Exoskeleton devices to date, however, have lacked comprehensive control systems that also are user-friendly to maximize the effectiveness and comfort for a legged exoskeleton device.

Examples of powered orthoses are known. WO/2010/044087, US 2010/0094188, and U.S. Pat. No. 8,096,965 disclose a powered exoskeleton bracing system/exoskeleton bracing system. These prior art devices, however, have been insufficient for comprehensive and user-friendly control of the exoskeleton device. The conventional methods of user interfacing with control of the device tended to focus on safety features to generate alerts that tend to be in response to a defective nature or state of the exoskeleton device or its components. Alerts, for example, may be provided as to such conditions as sensor fault(s), detection of "high" temperature(s), detection of battery charger or battery malfunction (High Severity Alerts accompanied by Solid Red LEDs), detection of "medium" temperature(s), detection of "critical" battery levels (Medium Severity Alerts accompanied by Flashing Red LEDs), detection of low temperature(s), and detection of "low" battery levels (Low Severity Alerts accompanied by Flashing Yellow LEDs). Furthermore, these Safety Methods describe protective behavior that the Legged Mobility Device will exhibit (beyond an indication or alert) should a fall occur in an attempt to prevent harm or in response to stimulus generally.

"Alerts" in the context of the above references has a specific context as understood by those of ordinary skill in the art. Within the context of the safety features described herein, alerts typically are: (1) associated with a hazard as to which the user may otherwise be unaware of, (2) as to which a user can perform a specific action to resolve, and (3) are accompanied by solid red, flashing red, and flashing yellow LEDs, respectively in exemplary conventional alert color schemes. Indications that do not meet these criteria are not considered alerts. For instance, if someone is falling, they are likely (1) aware of the situation, (2) cannot take specific action to resolve the situation, and (3) would not be paying attention to any alert. Accordingly, indications that do not meet the three above criteria generally are not considered safety "alerts" in this context.

There have been attempts to provide at least generalized control of an exoskeleton device, including the providing of safety indications. For example, U.S. Pat. No. 8,905,955 B2 discloses a method of controlling an exoskeleton bracing system comprising halting actuation of the motorized joints when a signal that is received from a tilt sensor indicates falling. These methods are described entirely within the context of standing and sitting transitions.

WO/2013/142777 discloses a method of controlling a powered lower extremity orthotic, wherein the leg support includes a thigh segment, shank segment, further comprising estimating an angle of the shank segment with respect to vertical. The device is control to take a step when the shank angle exceeds a threshold with respect to gravity, and the system further comprises signaling the user when placing the orthotic into a state corresponding to taking a step, the signal generally being accomplished by an auditory tone, haptic vibration, or visual cue. WO/2013/142777 also discloses a related method of controlling a powered lower extremity orthotic, wherein the leg support includes a thigh segment, shank segment. The method comprises estimating an angle of the shank segment with respect to vertical, and the device takes a step when the shank angle exceeds a threshold with respect to gravity. The method further comprises calculating a center of pressure average trajectory over time, calculating the variation of that location over time, and generating a proficiency score. The method further comprises restricting which exoskeleton states may be reached based on at least a threshold of said amount of variation.

WO/2014/159577 discloses a lower extremity orthosis configured to be coupled to a person, and a controller that receives signals from a plurality of sensors. The controller estimates at least one feedback ready value based on the sensor output, and at least one feedback system operated by the controller is configured to communicate the feedback ready value to the user. The orthosis provides the user with orthosis operational information not otherwise available to the user, wherein the feedback systems include at least one light indicating actuator effort, a plurality of lights proportionally indicating actuator torque, at least one light indicating force at an interface point, a plurality of lights proportionally indicating force at an interface point. The feedback ready value is selected from: force between user and orthosis, effort applied by orthosis, torque applied by orthosis, maximum effort applied over gait cycle, average effort applied over gait cycle, center of pressure, limb position, center of mass position, foot clearance, orthosis state, next orthosis action, optimal gain aid orientation, and movement of the person.

Although conventional indicator and control systems exist that provide certain alerts and/or output warnings, such control systems for exoskeleton devices to date have lacked comprehensiveness in a manner that is user-friendly to maximize the effectiveness for both enhanced comfort and safety for a legged mobility exoskeleton device.

SUMMARY OF THE INVENTION

The present invention is directed to safety monitoring and control systems and methods for a legged mobility device such as an "exoskeleton." Such methods relate to various aspects of the device state or function which serve to protect or inform the user. Exemplary device states or functions may include: device standby, status indications, elevated temperature/thermal protection, sensor and other fault detection, and safety alerts and other feedback to the user. Advantages of the present invention include safety monitoring and control methods for a mobility or other electromechanical device which can provide the user with alerts with respect to issues as to which the user can take a corrective action or other prescribed measure.

In contrast to conventional control systems and methods, such as those described above, the safety control methods described herein do not merely halt actuation as a response to falling or other safety hazards. Rather, the control system halts actuation in response to High Severity Alerts referenced above (e.g., sensor fault(s), detection of "high" temperature(s)). The safety methods also apply generally to all states of the exoskeleton device, and not just within the context of standing and sitting transitions as is conventional.

The safety control methods described herein may indicate that stepping is imminent (in this case by haptic vibration) and which leg specifically will step next (in this case via visual cue). In addition as compared to conventional configurations, however, stepping alerts occur in the state prior to stepping, as opposed to when the orthotic is placed into a state in which it will step. Providing an alert prior to actual stepping is advantageous because stepping indications are not thought to be useful once an actual step has been triggered. That is, in the present invention the user may be made fully aware that a step is imminent (due to visual cues and vibration). In addition, the safety control methods described herein do restrict which exoskeleton states may be reached. In contrast to conventional systems, however, the present invention does so due to either the device being in "standby" or because of an alert, as opposed to the variation of center of pressure as done in conventional systems.

Furthermore, the safety control methods described herein do include a feedback system operated by the control system. In contrast to the conventional systems described above, however, in the context of alerts the feedback systems are not used to indicate any of the conditions described herein. In addition to alerts, however, the feedback system of the present invention in some circumstances may also indicate a next device action (e.g. blinking light to indicate stepping leg), which may be correlated to device state (e.g., when a left light is blinking slowly, it can be inferred that the legged mobility device is in double support with the right foot forward).

As referenced above, the present invention is directed to safety monitoring and control systems and methods for a legged mobility device such as an "exoskeleton." Such methods relate to various aspects of the device state or function which serve to protect or inform the user. Exemplary device states or functions may include: (1) device standby, (2) status indications, and (3) device alerts which may include (a) elevated temperature/thermal protection, (b) sensor and other fault detection, and (c) safety alerts and other feedback to the user. Each such state or functions may corresponding to a particular safety alert and control response Device Standby is a control method that prevents accidental state transitions that may result in user instability or a fall. The exemplary embodiment related to Device Standby may include preventing unwanted transitions between the major mobility modes (e.g. stand, walk, sit) when the user manually puts the device into standby using a user interface, such as for example by short presses of the power buttons after the device has been turned on. Unwanted transitions among other modes (e.g. stair climbing), or states within a given mode (e.g. left step, right step), may be prevented either additionally or alternatively to prevent transitions between the major mobility modes. Furthermore, device standby may occur automatically or in response to other stimulus. While conventional configurations described in the background section suggest restricting device state based on center of pressure variation, the device standby method described herein, in which standby is volitional or based on other criteria, is not taught by prior configurations.

Status Indications is a control method by which device status is communicated or made known to the user. The exemplary embodiment related to Status Indications may include a visual indication interface for communicating wireless connectivity status, device standby status, and next step status, although other interfaces or indications may be included. For example, blue lights on both left and right aspects of the exoskeleton device may indicate that the device is in standby, while green lights may indicate that the exoskeleton device is active. A flashing light on one side of the exoskeleton device may be used to indicate which leg will step next. While conventional configurations described in the background section suggest communicating device states to the user, the status indication method described herein, in which states, actions and their method of communication are well defined, is not taught by prior configurations.

Device Alerts for Thermal Protection is a control method by which elevated temperatures are detected and utilized to modify device behavior to better protect the user and exoskeleton device components should elevated temperatures occur. The exemplary embodiment related to Thermal Protection may include limiting commanded current or torque in proportion to temperature levels, either continuously or in stages, such that continued temperature increase is less likely. Beyond a certain temperature threshold, the sit-to-stand (standing) and step-to-step (walking) mobility mode transitions may be disallowed, meaning that the user may only stand from walking, or sit from standing, to allow the actuators to cool. For enhanced safety, these effects may not be immediate. For example, the user must come to a stand or sit before current levels are correspondingly reduced to prevent disruption of a transition that is occurring and not yet complete. Beyond a certain higher temperature threshold, all motion may be prohibited, although a minimal level of current still may be available to provide some level of support. The thermal protection method described herein, in which temperatures affect device behavior in general, is not taught by prior configurations.

Device Alerts for Sensor Faults is a control method by which sensor issues are detected and utilized to modify device behavior to better protect the user and exoskeleton device components should sensor faults occur. The exemplary embodiment related to Sensor Faults may include preventing further state transitions when a fault has been detected and the device has reached a stable state, timed out, or ceased moving. For example, if a faulty position sensor signal is detected while standing, further state transitions may be prevented as soon as the standing state is achieved. Alternatively, joint motion may cease immediately upon certain circumstances of fault detection. In such a case position references may be held constant, gains would be reduced, and commanded current would saturate at lower values as soon as the fault occurs. Furthermore, redundant or similar sensors may be utilized exclusively when their counterparts fail. The sensor faults method described herein, in which faults effect device behavior in general, is not taught by prior configurations.

Device Alerts for Safety Alerts is a control method by which potential hazards are grouped according to severity, and result in similar specific device indications and behaviors. In the exemplary embodiment related to Safety Alerts, alerts for example may be issued in response to reduced battery levels, elevated motor temperatures, or in the presence of sensor faults. These alerts may be grouped according to severity and resulting device behavior. For example, a low battery may be considered a low severity alert, which corresponds to no change in device behavior, and resulting in a flashing yellow light. A sensor fault, however, may be considered a high severity alert, which corresponds to the cessation of device motion, and resulting in a solid red light. In this way, alerts of similar severity can be associated with the same indication and device behavior, even if their cause differs (e.g., a high motor temperature may be considered high severity as well, for example). Such alert scheme, wherein low and medium severity alerts involve flashing lights, still allows the indications to be visible. For example, if lights on both the left and right aspect of the exoskeleton device are flashing blue and yellow, the user know that the device is in standby, and that a low level alert is present. While conventional configurations described in the background section suggest alert schemes, the events which trigger the conventional alerts are either significantly different, overly ambiguous, or not associated with changes in device behavior, which all are in contrast to the present invention. The safety alerts method described herein, in which potential hazards are grouped according to severity, and result in comparable specific device indications and behaviors, is not taught by prior configurations.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 12 is a drawing depicting a perspective view of an exemplary actuator cassette.

FIG. 13 is a drawing depicting a cross-sectional view of an exemplary actuator cassette taken along the longitudinal direction.

DETAILED DESCRIPTION

Figure 1:
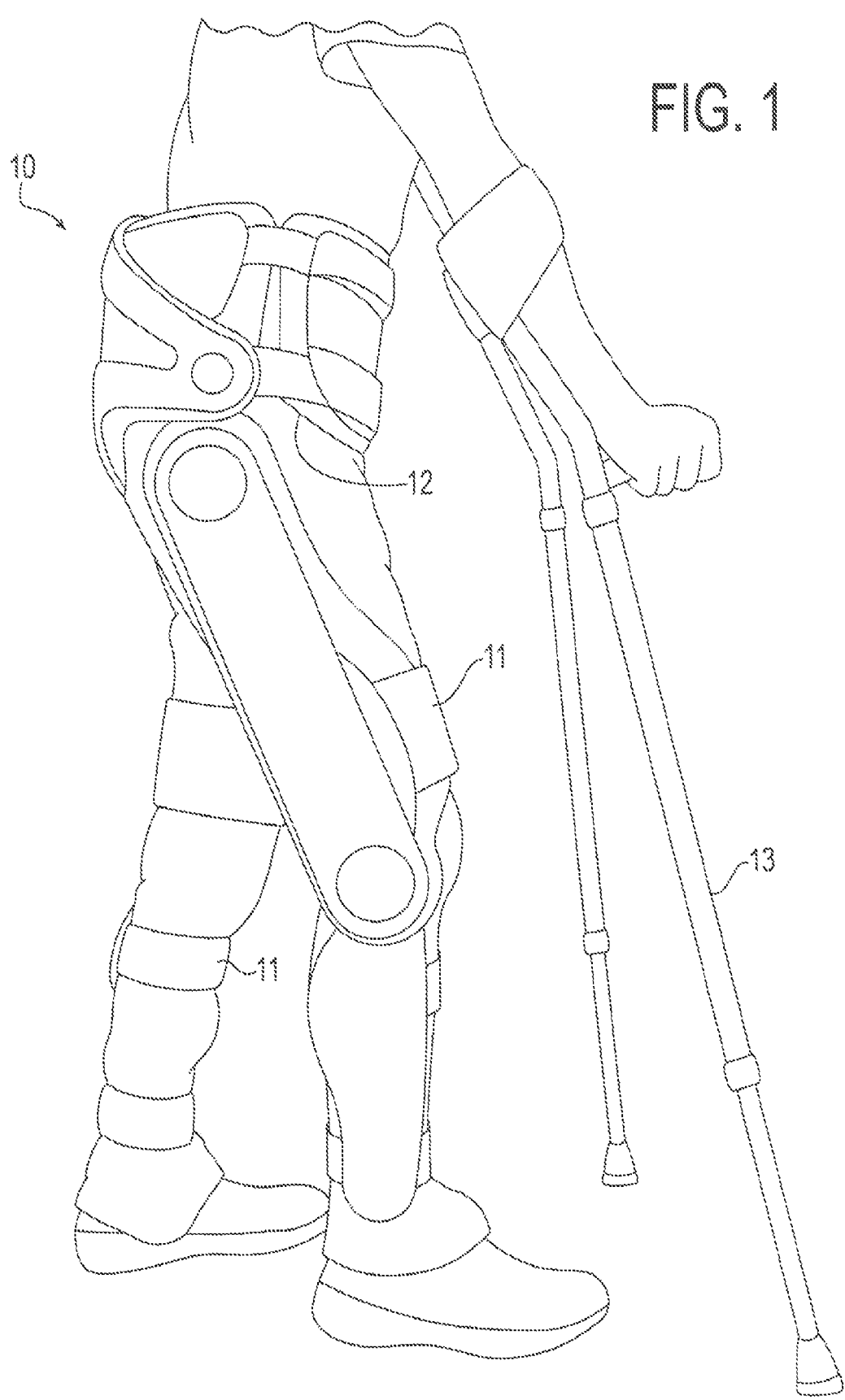
FIG. 1 is a drawing depicting an exemplary exoskeleton device as being worn by a user.

Embodiments of the present invention will now be described with reference to the drawings, wherein like reference numerals are used to refer to like elements throughout. It will be understood that the figures are not necessarily to scale.

For context, FIGS. 1-13 depict various views of an exemplary exoskeleton device that may be used in connection with the control system and methods of the present invention. A somewhat generalized description of such exoskeleton device is provided here for illustration purposes. A more detailed description of such device may be found in Applicant's International Patent Appl. No. PCT/US2015/023624 filed on Mar. 3, 2015, which is incorporated here in its entirety by reference. It will be appreciated, however, that the described exoskeleton device presents an example usage, and that the control system and methods of the present invention are not limited to any particular configuration of an exoskeleton device. Variations may be made to the exoskeleton device, while the features of the present invention remain applicable. In addition, the principles of this invention may be applied generally to any suitable mobility device. Such mobility devices include, for example, orthotic devices which aid in mobility for persons without use or limited use of a certain body portion, and prosthetic devices, which essentially provide an electromechanical replacement of a body part that is not present such as may be used by an amputee or a person congenitally missing a body portion.

As show in FIG. 1, an exoskeleton device 10, which also may be referred to in the art as a "wearable robotic device", can be worn by a user. To attach the device to the user, the device 10 can include attachment devices 11 for attachment of the device to the user via belts, loops, straps, or the like. Furthermore, for comfort of the user, the device 10 can include padding 12 disposed along any surface likely to come into contact with the user. The device 10 can be used with a stability aid 13, such as crutches, a walker, or the like.

Figure 2:
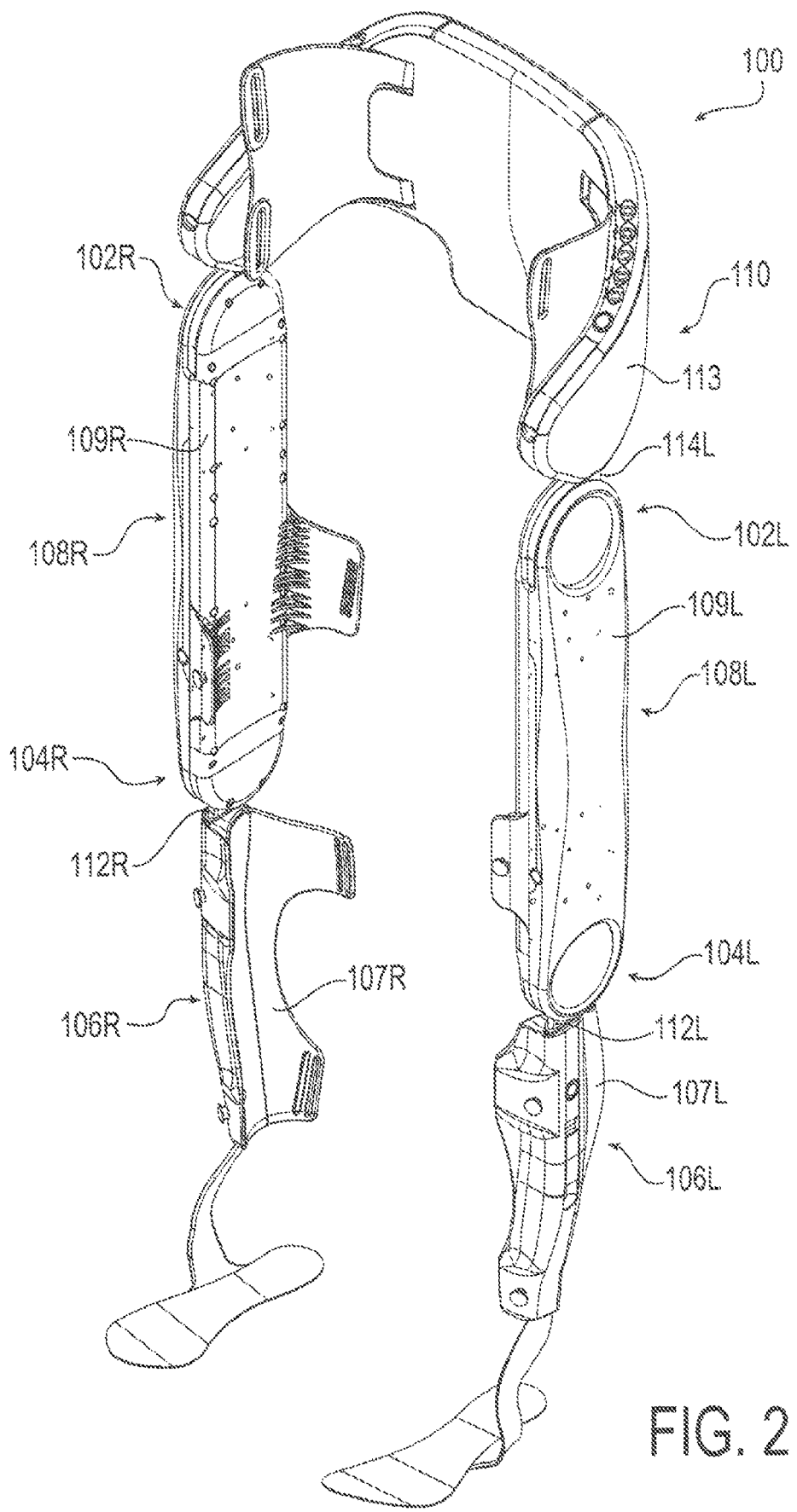
FIG. 2 is a drawing depicting a perspective view of an exemplary exoskeleton device in a standing position.
Figure 3:
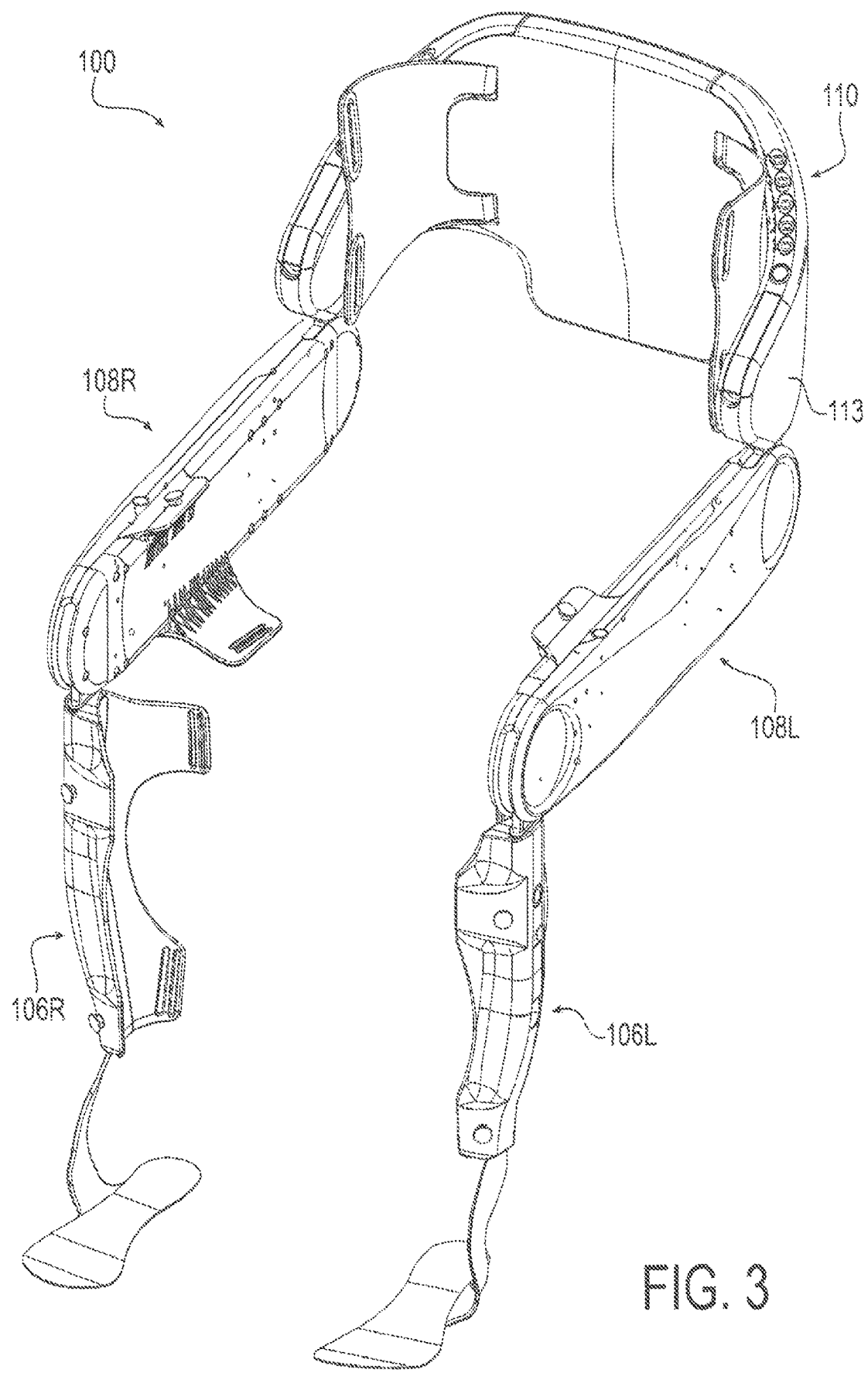
FIG. 3 is a drawing depicting a perspective view of the exemplary exoskeleton device in a seated position.
Figure 4:
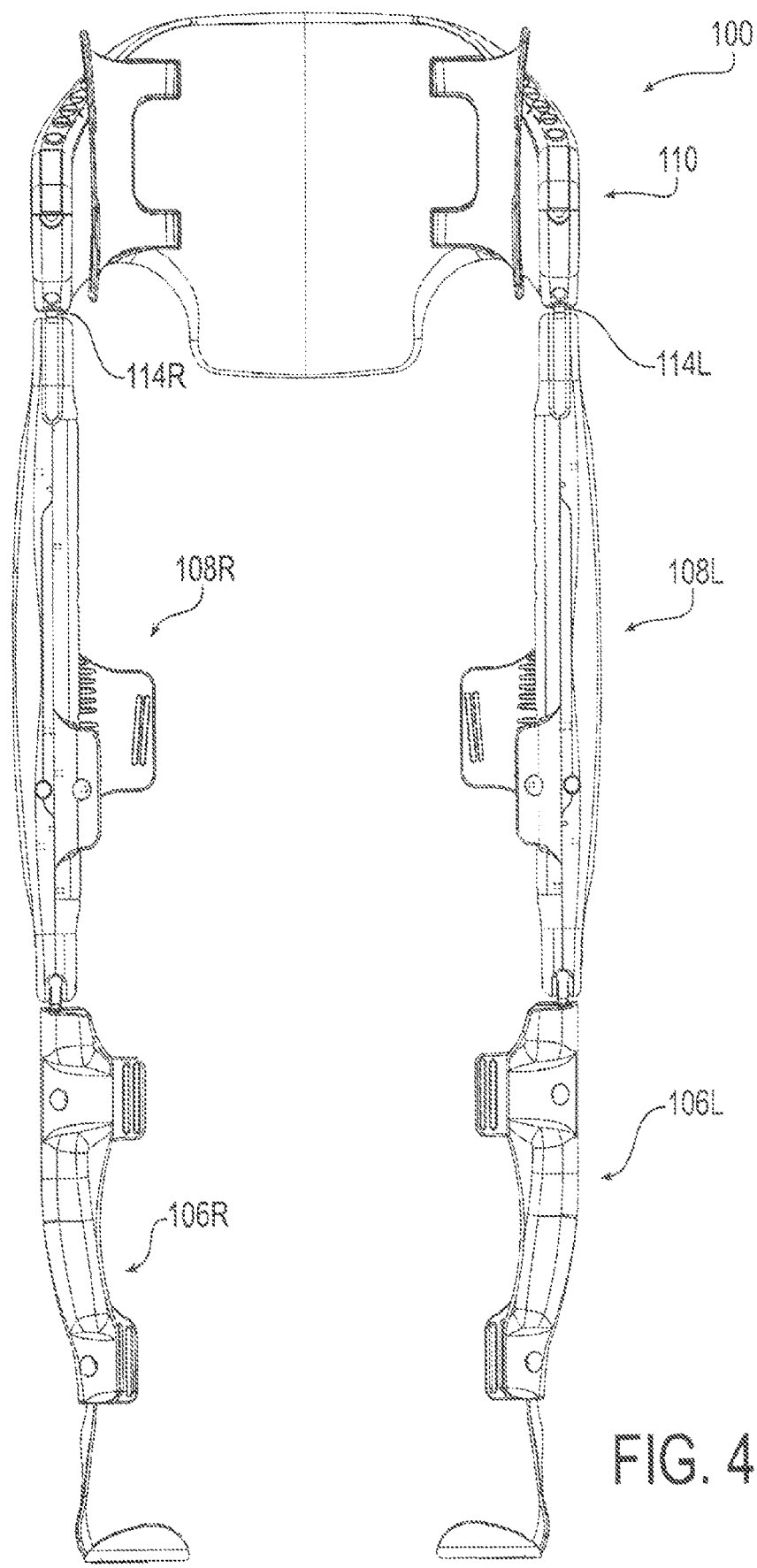
FIG. 4 is a drawing depicting a front view of the exemplary exoskeleton device in a standing position.
Figure 5:
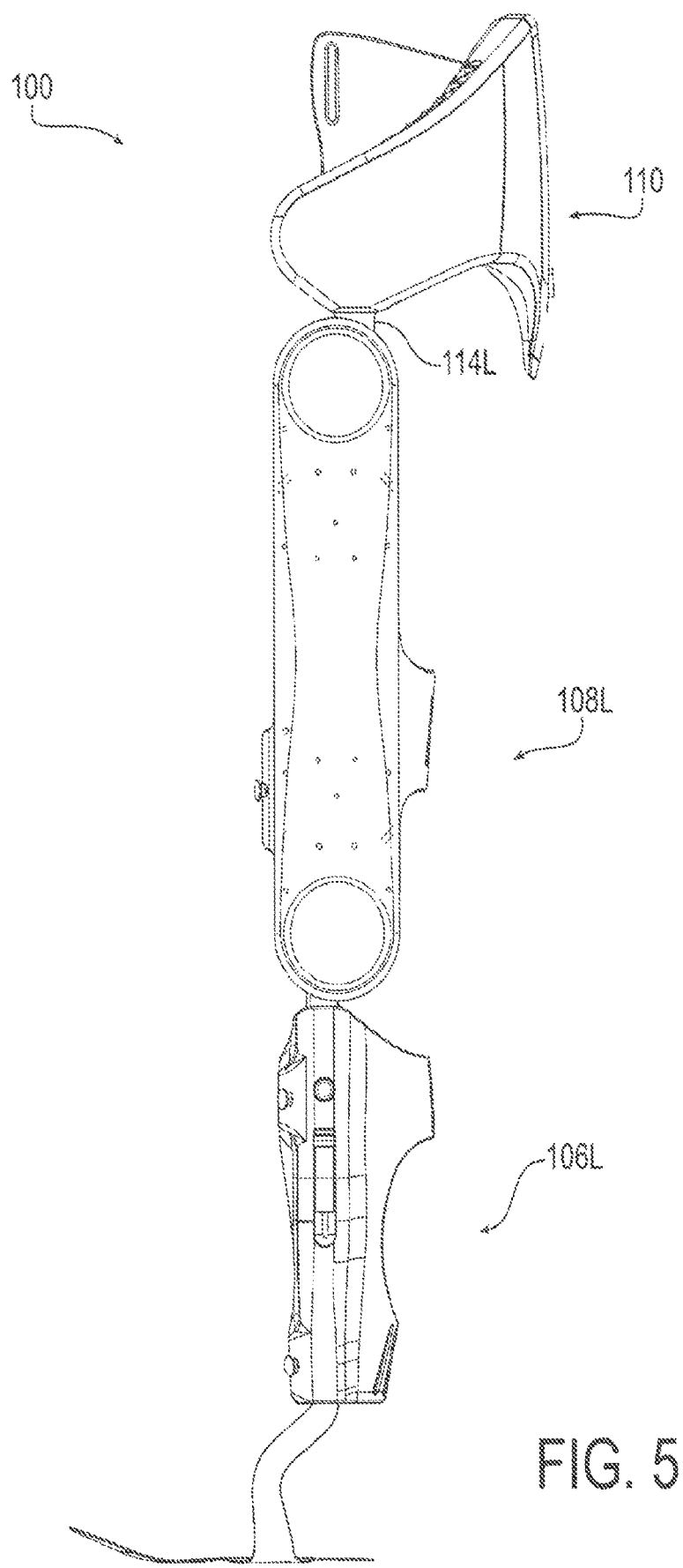
FIG. 5 is a drawing depicting a side view of the exemplary exoskeleton device in a standing position.
Figure 6:
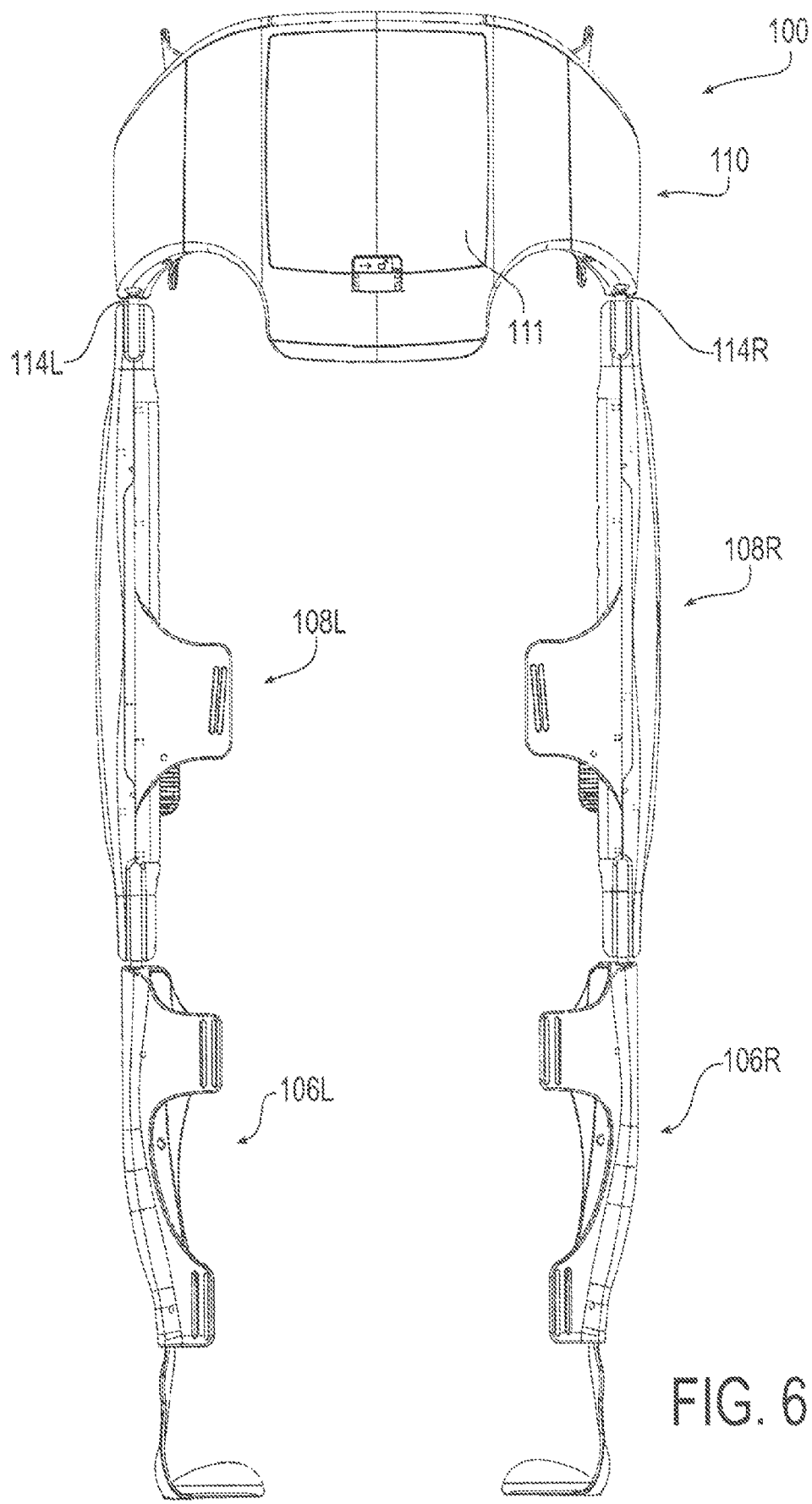
FIG. 6 is a drawing depicting a back view of the exemplary exoskeleton device in a standing position.
Figure 7:
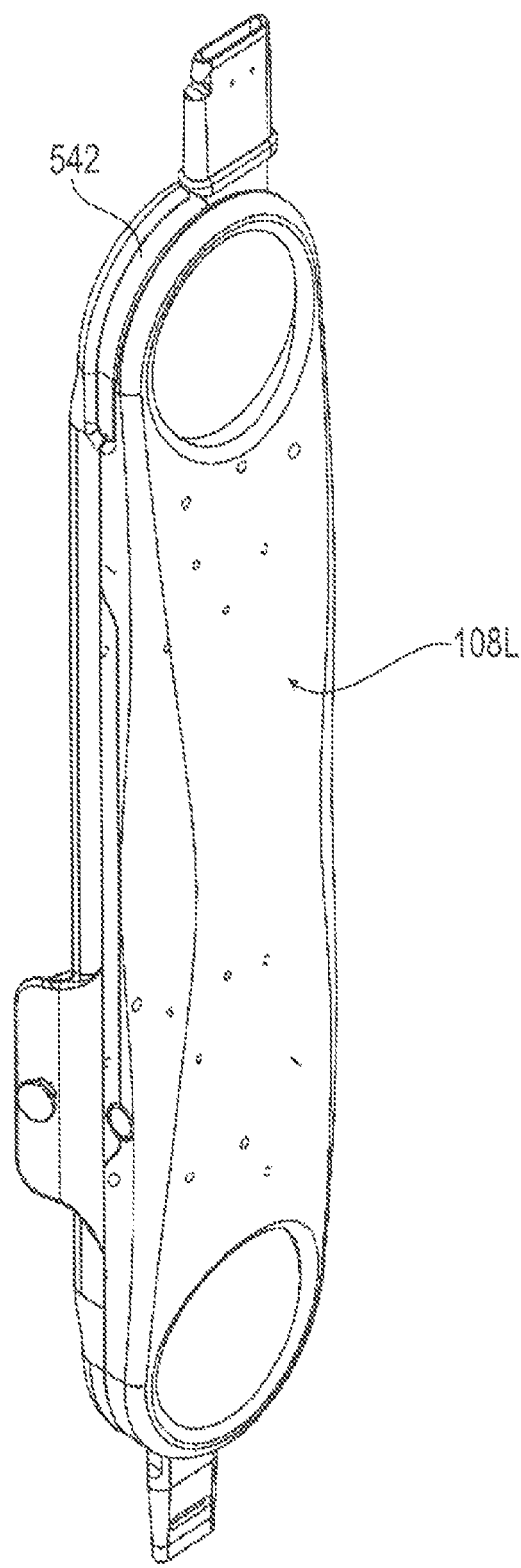
FIG. 7 is a drawing depicting a perspective view of an exemplary thigh assembly having two exemplary actuator cassettes installed therein.
Figure 8:
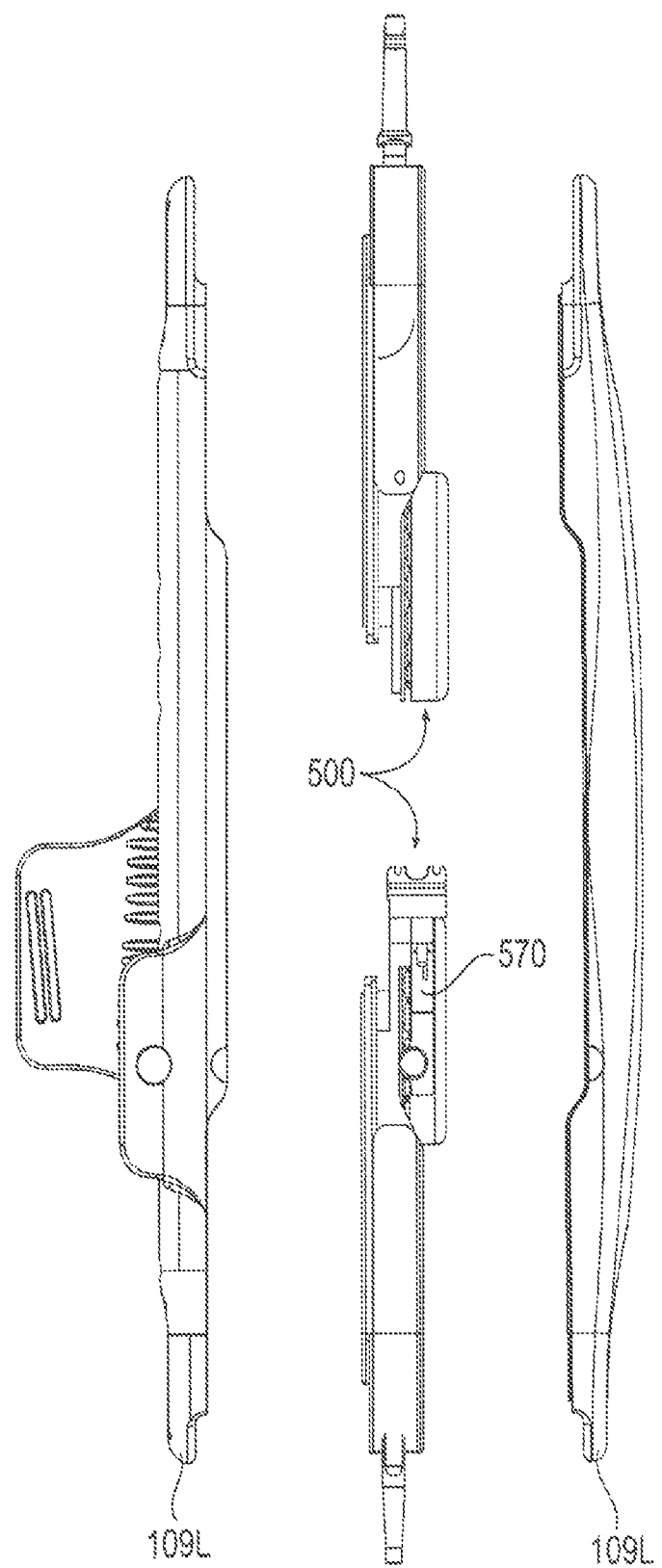
FIG. 8 is a drawing depicting a front exploded view of the exemplary thigh assembly having two exemplary actuator cassettes installed therein.
Figure 9:
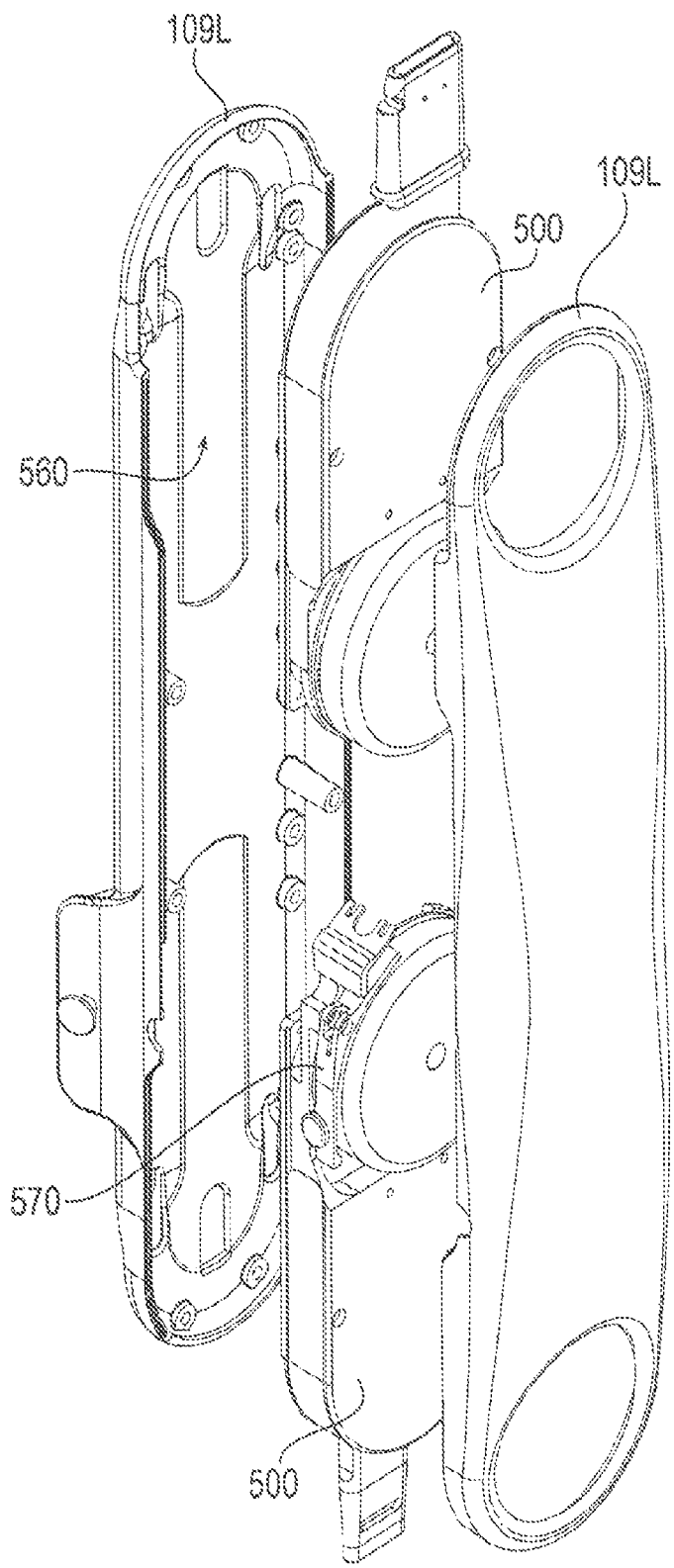
FIG. 9 is a drawing depicting a perspective exploded view of the exemplary thigh assembly having two exemplary actuator cassettes installed therein.
Figure 10:
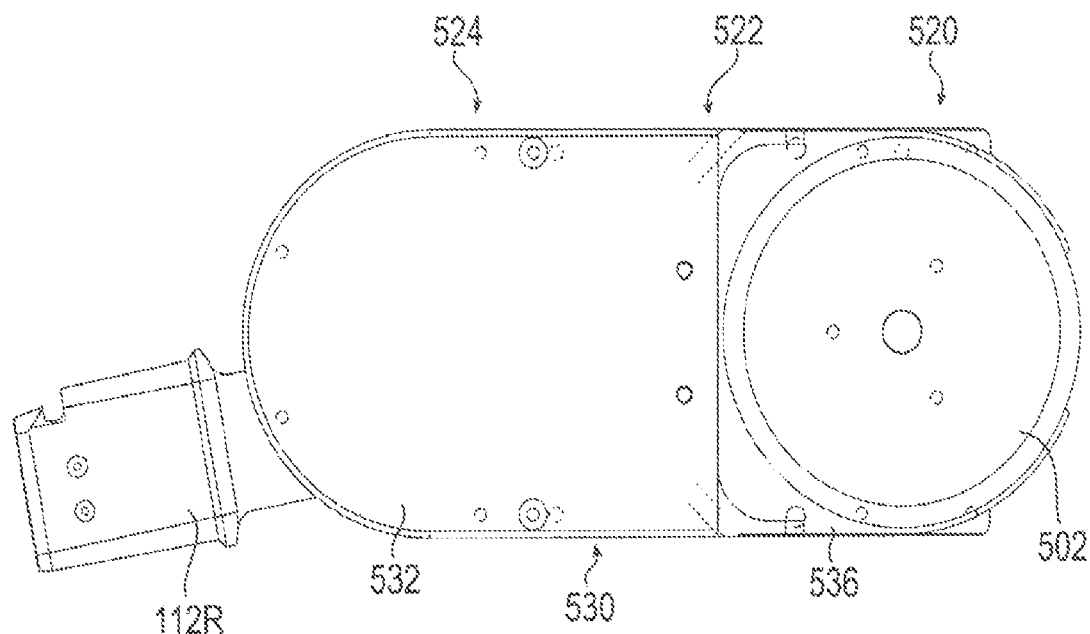
FIG. 10 is a drawing depicting a top view of an exemplary actuator cassette.
Figure 11:
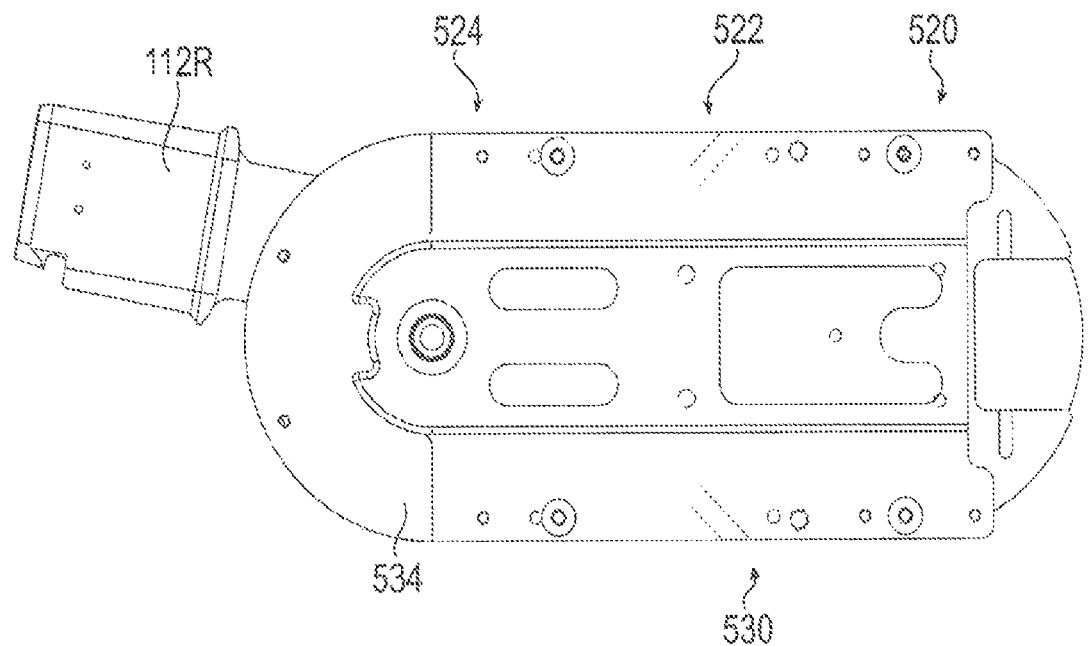
FIG. 11 is a drawing depicting a bottom view of an exemplary actuator cassette.

An exemplary legged mobility exoskeleton device is illustrated as a powered lower limb orthosis 100 in FIGS. 2-6. Specifically, the orthosis 100 shown in FIGS. 2-6 may incorporate four drive components configured as electromotive devices (for example, electric motors), which impose sagittal plane torques at each knee and hip joint components including (right and left) hip joint components 102R, 102L and knee joint components 104R, 104L. FIG. 2 shows the orthosis 100 in a standing position while FIG. 3 shows the orthosis 100 in a seated position.

As seen in the figures, the orthosis contains five assemblies or modules, although one or more of these modules may be omitted and further modules may be added (for example, arm modules), which are: two lower (right and left) leg assemblies (modules) 106R and 106L, two (left and right) thigh assemblies 108R and 108L, and one hip assembly 110. Each thigh assembly 108R and 108L includes a respective thigh assembly housing 109R and 109L, and link, connector, or coupler 112R and 112L extending from each of the knee joints 104R and 104L and configured for moving in accordance with the operation of the knee joints 104R and 104L to provide sagittal plane torque at the knee joints 104R and 104L.

The connectors 112R and 112L further may be configured for releasably mechanically coupling each of thigh assembly 108R and 108L to respective ones of the lower leg assemblies 106R and 106L. Furthermore, each thigh assembly 108R and 108L also includes a link, connector, or coupler 114R and 114L, respectively, extending from each of the hip joint components 102R and 102L and moving in accordance with the operation of the hip joint components 102R and 102L to provide sagittal plane torque at the knee joint components 104R and 104L. The connectors 114R and 114L further may be configured for releasably mechanically coupling each of thigh assemblies 108R and 108L to the hip assembly 110.

In some embodiments, the various components of device 100 can be dimensioned for the user. However, in other embodiments the components can be configured to accommodate a variety of users. For example, in some embodiments one or more extension elements can be disposed between the lower leg assemblies 106R and 106L and the thigh assemblies 108R and 108L to accommodate users with longer limbs. In other configurations, the lengths of the two lower leg assemblies 106R and 106L, two thigh assemblies 108R and 108L, and one hip assembly 110 can be adjustable. That is, thigh assembly housings 109R, 109L, the lower leg assembly housings 107R and 107L for the lower leg assemblies 106R, 106L, respectively, and the hip assembly housing 113 for the hip assembly 110 can be configured to allow the user or medical professional to adjust the length of these components in the field. For example, these components can include slidable or movable sections that can be held in one or more positions using screws, clips, or any other types of fasteners. In view of the foregoing, the two lower leg assemblies 106R and 106L, two thigh assemblies 108R and 108L, and one hip assembly 110 can form a modular system allowing for one or more of the components of the orthosis 100 to be selectively replaced and for allowing an orthosis to be created for a user without requiring customized components. Such modularity can also greatly facilitate the procedure for donning and doffing the device.

In orthosis 100, each thigh assembly housing 109R, 109L may include substantially all the drive components for operating and driving corresponding ones of the knee joint components 104R, 104L and the hip joint components 102R, 102L. In particular, each of thigh assembly housings 109R, 109L may include drive components configured as two motive devices (e.g., electric motors) which are used to drive the hip and knee joint component articulations. However, the various embodiments are not limited in this regard, and some drive components can be located in the hip assembly 110 and/or the lower leg assemblies 106R, 106L.

A battery 111 for providing power to the orthosis can be located within hip assembly housing 113 and connectors 114R and 114L can also provide means for connecting the battery 111 to any drive components within either of thigh assemblies 108R and 108L. For example, the connectors 114R and 114L can include wires, contacts, or any other types of electrical elements for electrically connecting battery 111 to electrically powered components in thigh assemblies 108R and 108L. In the various embodiments, the placement of battery 111 is not limited to being within hip assembly housing 113. Rather, the battery can be one or more batteries located within any of the assemblies of orthosis 100.

The referenced drive components may incorporate suitable sensors and related internal electronic controller or control devices for use in control of the exoskeleton device. Such internal control devices may perform using the sensory information the detection of postural cues, by which the internal control device will automatically cause the exoskeleton device to enter generalized modes of operation, such as sitting, standing, walking, variable assist operation, and transitions between these generalized modes or states (e.g., Sit to Stand, Stand to Walk, Walk to Stand, Stand to Sit, etc.) and step transition (e.g., Right Step, Left Step). The internal electronic control devices further may perform fall mitigation and recovery operations for the exoskeleton device, as described for example in Applicant's International Patent Appl. No. PCT/US2016/016319 filed on Feb. 3, 2016, which is incorporated here in its entirety by reference.

The internal electronic control devices and related electronics further may incorporate or include a mobility device communications interface that is configured to transmit and receive signals over an electronic signal interface. In exemplary, the mobility device communications interface may communicate electronically over a wireless interface by transmitting signals to and receiving signals from a communications interface of an electronic communication device including a control application for controlling the drive components of the mobility device.

To perform such operations, the drive systems and internal control device of the mobility device may employ the use of accelerometers, gyroscopes, inertial measurement, and other sensors to detect and observe the upper leg orientation or angle and angular velocity. The internal control device may then selectively control the drive components to modulate the joint components, and particularly the knee and hip joint components, to apply torque, implement locked or released states, or otherwise effect positioning or movement of the joint components control of the exoskeleton device for mode operation or for fall mitigation.

To implement the features of the present invention, the electronic control device may include one or processor devices that are configured to execute program code stored on a non-transitory computer readable medium embodying the control methods associated the generalized control of the exoskeleton device, including the control operations of the present invention. It will be apparent to a person having ordinary skill in the art of computer programming of electronic devices how to program the electronic control device to operate and carry out logical functions associated with present invention. Accordingly, details as to specific programming code have been left out for the sake of brevity. Also, controller functionality could be carried out via dedicated hardware, firmware, software, or any combinations thereof, without departing from the scope of the invention. As will be understood by one of ordinary skill in the art, therefore, the electronic control device may have various implementations. For example, the electronic control device may be configured as any suitable processor device, such as a programmable circuit, integrated circuit, memory and I/O circuits, an application specific integrated circuit, microcontroller, complex programmable logic device, other programmable circuits, or the like. The electronic control device may also include a non-transitory computer readable medium, such as random access memory (RAM), a read-only memory (ROM), an erasable programmable read-only memory (EPROM or Flash memory), or any other suitable medium. Instructions for performing the methods described below may be stored in the non-transitory computer readable medium and executed by the processor device.

In the various embodiments, to maintain a low weight for orthosis and a reduced profile for the various components, the drive components may include a substantially planar drive system that is used to drive the hip and knee articulations of the joint components. For example, each motor can respectively drive an associated joint component through a speed-reduction transmission using an arrangement of sprocket gears and chains substantially parallel to the plane of sagittal motion. Referring to FIGS. 7-13, consolidating the moveable parts into self-contained units, referred to herein as "cassettes," allow for ease of maintenance and replacement because cassettes are swappable, making them easier to service or requiring less of a variety in spare components. As used herein, "self-contained" means that the cassette includes everything necessary to operate in a fully functional manner if supplied with power. Thus, for example, if power is supplied to electrical contacts of the cassette, the cassette would actuate.

In the illustrated embodiment of the drive components, the motor is integrated onto a common baseplate along with sprockets that control the motion of a joint link. Bearings and chains, with and/or without tensioners provide smooth and efficient transfer of motion from the motor to the joint angle. Integrating the motor into the cassette allows for a thinner overall package configuration and provides consistent alignment among parts. Moreover, integrating the motor also creates a larger surface area to transfer and emit heat generated by the motor. In the instance of a mobility assistance device, these cassettes may pertain to a specific joint or set of joints on the device. Each may have a unique actuation unit or share an actuation unit. They may include actuators, with or without a power source, and/or a method of transmitting movement. The illustrated embodiment includes a brushless DC motor with chains and sprockets to create and transmit motion, although other embodiments may utilize electric motors, linear actuators, piezoelectric actuators, belts, ball screws, harmonic drive, gear drive (bevel or planetary), or any combination thereof. The cassettes may also house the electronic control device, and further may contain the referenced sensor elements such as the accelerometers, gyroscopes, inertial measurement, and other sensors to detect and observe the upper leg orientation or angle and angular velocity. The self-contained cassette units can be preassembled to aid in manufacturing the broader device. This allows for quick servicing of the device since individual cassettes can be swapped out and serviced.

Therefore, a removable, self-contained, ovular actuator cassette 500 may be receivable in a receptacle of a wearable robotic device. The cassette 500 may include a first circular portion 520 housing a motive device (e.g., an electric motor) 502. A second circular portion 522 may be longitudinally offset and longitudinally overlapping the first circular portion and may house a first portion of a drivetrain 514, 516 operatively coupled to and driven by the motive device 502. A third circular portion 524 may be longitudinally offset from the first and second circular portions and longitudinally overlapping the second circular portion and may house a second portion of the drivetrain 504. These three overlapping circular portions make an ovular shape, which may include the referenced sensors and electronic control devices. Therefore, an ovular housing 530 may support the motive device 502 and drivetrain 502, 514, 516. Long sides of the ovular housing are straight and parallel with each other and tangentially terminate as curved end surfaces of the ovular housing.

Referring to FIGS. 7-13, with FIG. 13 of the right side being representative, the powered joints may be implemented by disposing a joint sprocket gear 504 at one end of thigh assembly housing 109R parallel to the sagittal plane and configuring the joint sprocket gear 504 to rotate parallel to the sagittal plane. To provide the sagittal plane torque for knee joint component 102R, the connector 112R can extend from the joint sprocket gear 504 and be mechanically connected, so that rotation of the joint sprocket gear 504 results in application of torque to the lower leg assembly 106. A slot or receiving element can be provided for the connector 112R to link the thigh assembly 108R and lower leg assembly 106R. The receiving element and the connector 112R can be configured such that the connector can removably connect the thigh assembly 108R and lower leg assembly 106R. In the various embodiments, clips, screws, or any other types of fastener arrangements can be used to provide a permanent or a removable connection. In some embodiments, quick connect or "snap-in" devices can be provided for providing the connection. That is, these quick connect devices allow connections to be made without the need of tools. These types of quick connect devices can not only be used for mechanically coupling, but for electrical coupling with the sensors and control electronics. In some embodiments, a single quick connect device can be used to provide both electrical and mechanical coupling. However, the various embodiments are not limited in this regard and separate quick connect devices can be provided for the electrical and mechanical coupling. It is worth noting that with quick disconnect devices at each joint, the orthosis can be easily separated into three or five modular components—right thigh, left thigh, right lower leg, left lower leg, and hip assemblies—for ease of donning and doffing and also for increased portability.

The knee joint component 104R may be actuated via operation of a motor 502, as discussed above. The motor 502 can be an electric motor that drives the knee joint 104R (i.e., joint sprocket gear 504) using a two-stage chain drive transmission. For example, as shown in FIG. 13, a first stage can include the motor 502 driving, either directly or via a first chain, a first drive sprocket gear 514. The first drive sprocket gear 514 is mechanically coupled to a second drive sprocket gear 516 so that they rotate together about the same axis based on the power applied by motor 502 to first drive sprocket gear 514. The second drive sprocket gear 516 can be arranged so that it is disposed in the same plane as the joint gear 504. Thus, a second chain can then be used to drive joint sprocket gear 504 using the second drive sprocket gear 516 and actuate the knee joint 104R. The gear ratios for the various components described above can be selected based on a needed amount of torque for a joint, power constraints, and space constraints.

Each stage of the chain drive transmission can include tensioners, which can remove slack from a chain and mitigate shock loading. Such tensioners can be adjustable or spring loaded. In addition, a brake 570 can be provided for motor 502. For example, a solenoid brake may be provided which engages a brake pad against the rotor 524 of the motor 502 in one state, and disengages the brake pad in another state. However, the various embodiments are not limited to this particular brake arrangement and any other methods for providing a brake for motor 502 can be used without limitation.

The configuration illustrated in FIG. 13 has been discussed above with respect to an arrangement of sprocket gears and chains. However, the various embodiments are not limited in this regard. That is, any other arrangement of gears, with or without chains, and providing a reduced profile can be used. Furthermore, the various embodiments disclosed herein are not limited to an arrangement of gears and/or chains. For example, in some configurations, a belt and pulley arrangement could be used in place of the chain and sprocket arrangement. Furthermore, a friction drive arrangement can also be used. Also, any combination of the arrangements discussed above can be used as well. Additionally, different joints can employ different arrangements.

In the various embodiments of the drive components, a motor for each of the hip and knee joint components 102R, 102L, 104R, 104L can be configured to provide a baseline amount of continuous torque and a higher amount of torque for shorter periods of time. For example, in one configuration, at least 10 Nm of continuous torque and at least 25 Nm of torque for shorter (i.e., 2-sec) durations are provided. In another example, up to 12 Nm of continuous torque and 40 Nm of torque for shorter (i.e., 2-sec) durations. As a safety measure, both knee joints 104R and 104L can include normally locked brakes, as discussed above, in order to preclude knee buckling in the event of a power failure.

Figure 14:
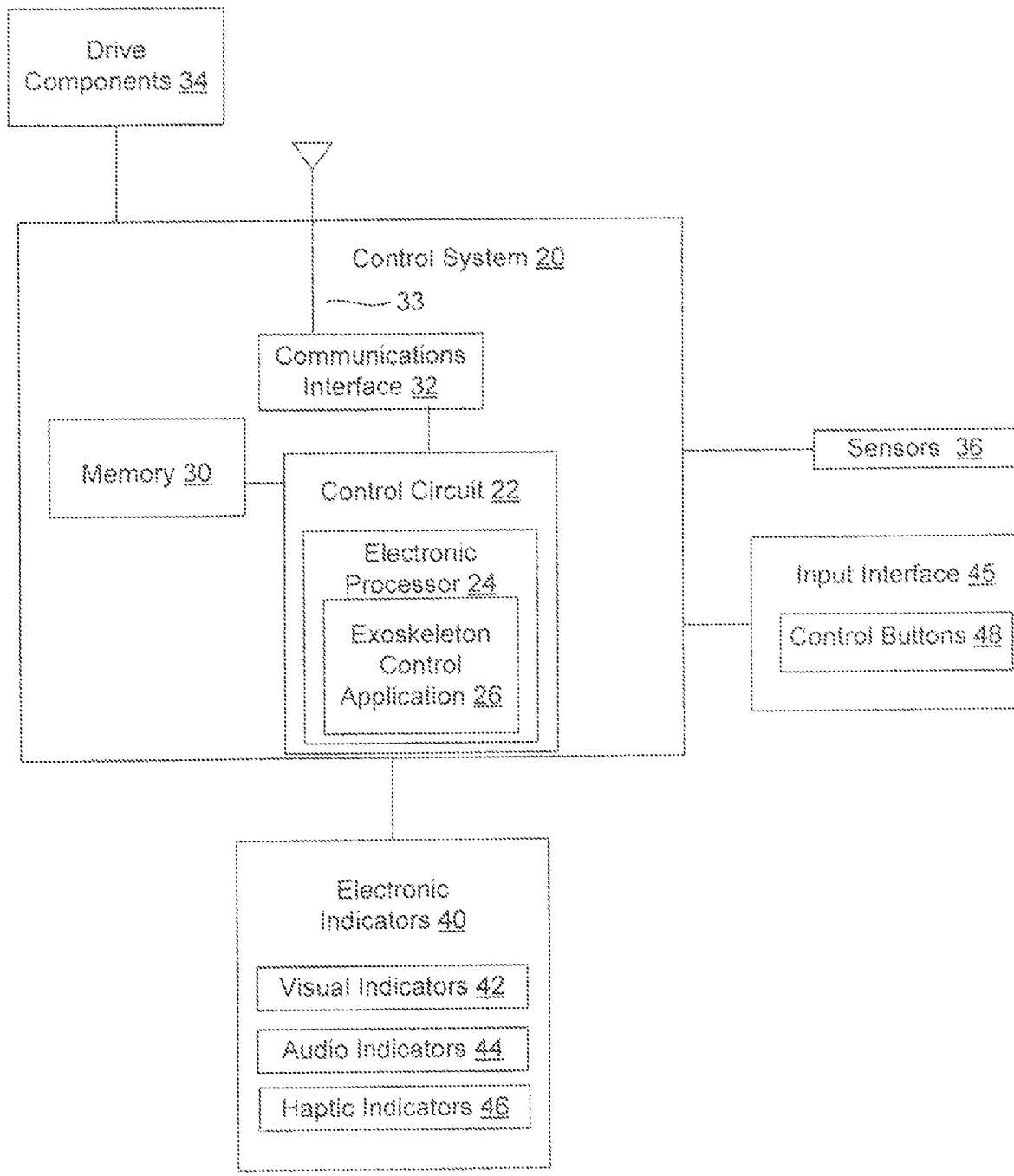
FIG. 14 is a drawing depicting a schematic block diagram of operative portions of an exemplary control system and related electronic components in accordance with embodiments of the present invention.

FIG. 14 is a drawing depicting a schematic block diagram of operative portions of an exemplary control system 20 and related electronic components in accordance with embodiments of the present invention. The control system 20 may include a primary control circuit 22 that is configured to carry out various control operations relating to control of the exoskeleton device. The control circuit 22 may include an electronic processor 24, such as a CPU, microcontroller or microprocessor. Among their functions, to implement the features of the present invention, the control circuit 22 and/or electronic processor 24 may comprise an electronic controller that may execute program code embodied as the exoskeleton control application 26. It will be apparent to a person having ordinary skill in the art of computer programming, and specifically in application programming for electronic and communication devices, how to program the device to operate and carry out logical functions associated with application 26. Accordingly, details as to specific programming code have been left out for the sake of brevity.

The exoskeleton control application 26 may be stored in a non-transitory computer readable medium, such as random access memory (RAM), a read-only memory (ROM), an erasable programmable read-only memory (EPROM or Flash memory), or any other suitable medium. In the example of FIG. 14, the exoskeleton control application 26 is shown as being stored internally within the processing components, but the application also may be stored in an additional memory device such as the memory 30. Instructions for performing the methods described below that are stored in the non-transitory computer readable medium may be executed by the processor components 22 and 24. Also, while the code may be executed by control circuit 22 or processor 24 in accordance with an exemplary embodiment, such controller functionality could also be carried out via dedicated hardware, firmware, software, or combinations thereof, without departing from the scope of the invention.

The control system 20 may constitute internal electronic control devices and related electronics incorporated into one or more of the exoskeleton device components, and typically may be incorporated into one or more of the thigh assembly or hip assembly. The control system 20 further may include a communications interface 32 for electronic communication with components external to the control system. For example, the communications interface may provide for electronic communication via an antenna 33 with an external mobile communication device, and thus may be configured to transmit and receive signals over an electronic signal interface. In exemplary embodiments, the communications interface may communicate electronically with an external mobile communication device over a wireless interface by transmitting signals to and receiving signals from the drive components for control of the mobility device. A mobile communications device and related control systems and methods are disclosed Applicant's International Patent Appl. No. PCT/US2016/40304 filed on Jun. 30, 2016, which is incorporated here in its entirety by reference.

The control system 20 further may be in electronic communication with both sensory and drive components of the exoskeleton device. The connections may be hard wired connections via internal circuit boards and other wired connections, but wireless communication also may be employed between the control system and/or sensor and drive components. In FIG. 14 the drive components (which are described in detail above) are generally indicated by block 34, and the sensors are generally indicated by block 36. For gathering appropriate sensory information, the sensors 36 may include the use of accelerometers, gyroscopes, inertial measurement, and other sensors to detect and observe the upper leg and torso orientation or angle and angular velocity. Example sensors may include hall effect sensors, magnetic angle sensors, accelerometer sensors, gyroscope sensors, resistance temperature detectors, and others. There also may be one or more redundant sensors that correspond respectively to one or more of the above sensors, and the redundant sensors may provide sensor information when there is a sensor fault detected in a respective sensor.

The control system 20 may then selectively control the drive components 34 to configure and modulate the joint components of the exoskeleton device, and particularly the knee and hip joint components, to apply torque, implement locked or released states, or otherwise effect positioning or movement of the joint components control of the exoskeleton device for various modes operation and for fall mitigation.

As described for example in Applicant's referenced previous patent applications, in the described exoskeleton device operation generally is automated based on sensory detections. As an example, to go from sit to stand a user may pull in the legs and lean forward, as any person normally does when getting ready to stand. Upon sensing such a pre-standing position, the exoskeleton drive system would send a haptic feedback signal to the user, such as a vibration indicator, informing the user that a transition to standing will occur. Control of mobility mode of operation (sit, stand, walk, etc.), and transitions between mobility modes, proceeds as warranted. Mode transitions and mode operation, therefore, is operated generally by the sensors reading user postural cues, which are interpreted by the control system that in turn generates control signals to drive operation of the drive components.

The control system 20 further may be in electronic communication with a plurality of electronic indicators 40. In FIG. 14, the electronic indicators are generally indicated by block 40. The electronic indicators may include visual indicators 42 that indicate aspects of device state and operation by lighting. In exemplary embodiments, the lighting may be color-coded lighting in which light emitting diodes (LEDs) are employed as the visual indicators. The electronic indicators further may include audio indicators 44, by which speakers may be employed to provide audio alerts pertaining to aspects of device state and operation. Different sounds may be employed for different types of audio alerts, and may be used in combination with the visual indicators 42 to provide multiple indicator combinations corresponding to information pertaining to different aspects of device state and operation. The electronic indicators further may include haptic indicators 46. The haptic indicators 46 may be configured as vibration generators that provide vibration indications as alerts pertaining to aspects of device state and operation. In exemplary embodiments, the haptic indicators are the joint motors themselves, which are commanded to vibrate while still operable to produce motion.

The control system 20 further may be in electronic communication with an input interface 45. The input interface may be configured as an electronic control panel that permits user inputs for control of the exoskeleton device. The input interface may include and one or more control inputs 48 that may provide a varied array of control options for a user, including a power button for turning on an enabling the exoskeleton device.

The described exoskeleton device can be controlled in a manner that provides safety monitoring and related device alerts. The methods may be performed by the control system 20, for example via the processor components control circuit 22 and/or processor 24 executing the program code embodying the exoskeleton control application 26 stored on a non-transitory computer readable medium.

Figure 15:
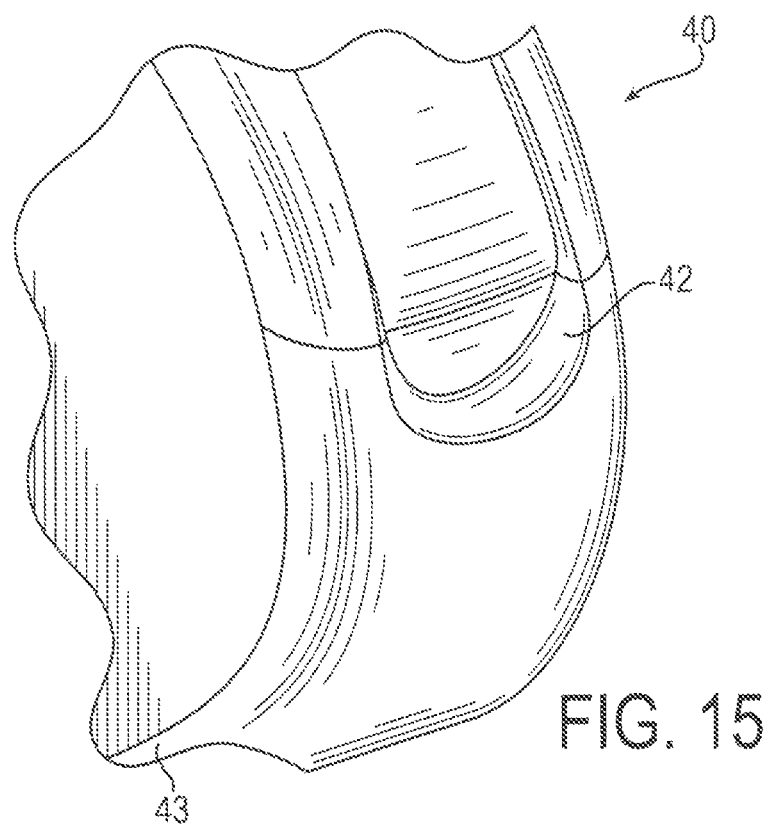
FIG. 15 is a drawing depicting an exemplary configuration of an electronic indicator in accordance with embodiments of the present invention.

FIG. 15 is a drawing depicting an exemplary configuration of an electronic indicator 40 in accordance with embodiments of the present invention. FIG. 15 depicts one such electronic indicator 40, and it will be appreciated that a given exoskeleton device typically may include a plurality of electronic indicators 40. In a preferred embodiment for a legged mobility exoskeleton, a first electronic indicator 40 is provided on a right side of the exoskeleton device for indications as to right side operation, and a second electronic indicator 40 is provided on a left side of the exoskeleton device for indications as to left side operation As referenced above, the electronic indicator 40 may include a visual indicator 42 comprising a light source capable of emitting light of a multitude of colors. The visual indicator 42 may be configured as LEDs that each emit light of particular color. As further detailed below, the colors may be coded so that different colors respectively correspond with different aspects of device state and operation. FIG. 15 provides a depiction particularly of the visual indicator 42. The visual indicator 42 may be embedded in a housing 43 in a manner that permits ready visualization of the visual indicator 42 to the user. Speakers (not shown in the figure) also may be provided to emit related audio alerts, and an internal vibration generator may be incorporated into the exoskeleton device to provide haptic feedback as well as referenced above.

Figure 16:
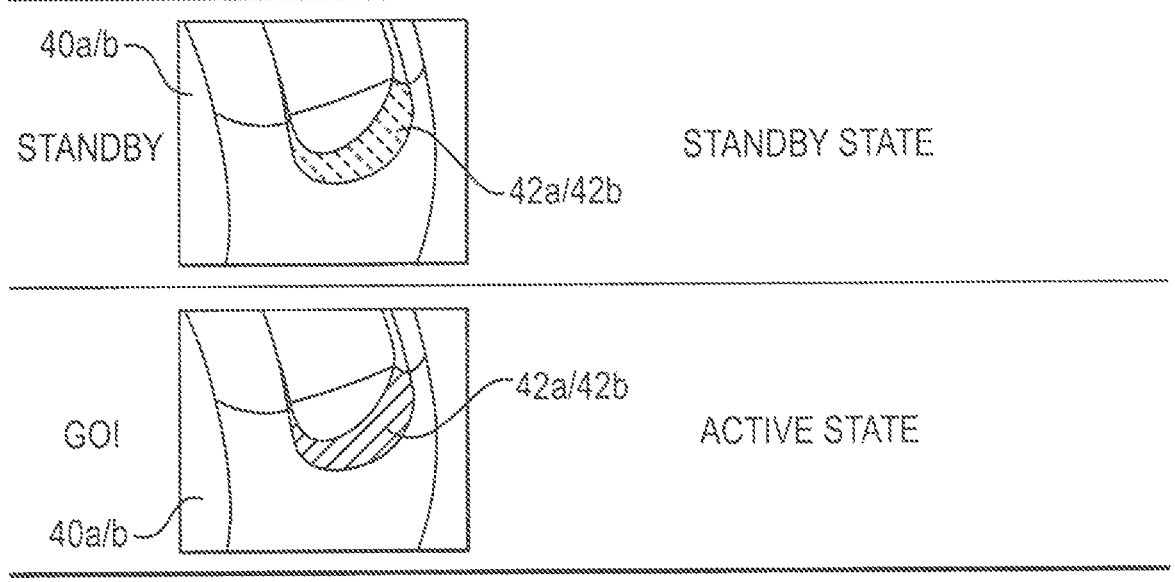
FIG. 16 is a drawing depicting an exemplary configuration of electronic indicators corresponding to a Device Standby control method in accordance with embodiments of the present invention.
Figure 17:
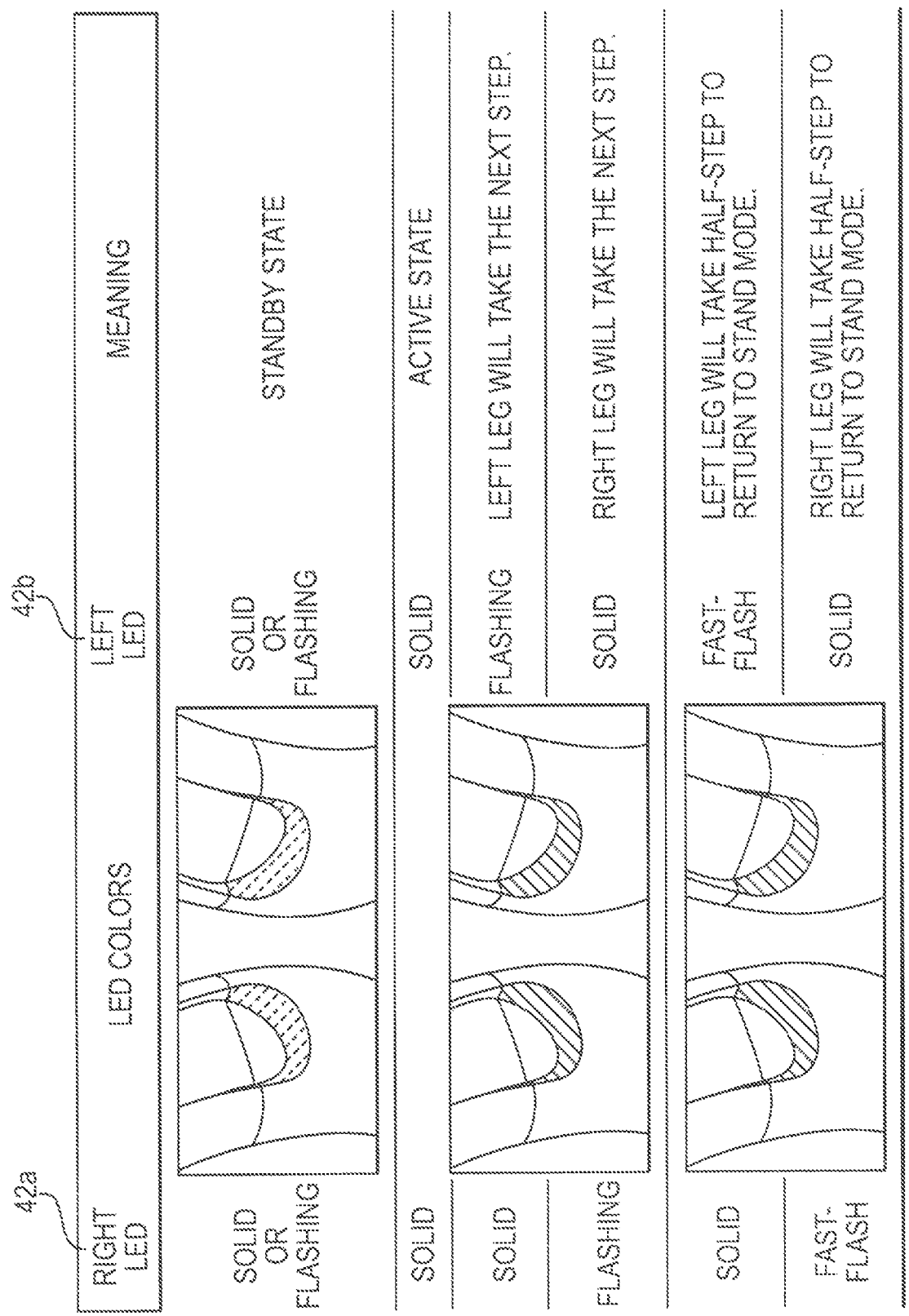
FIG. 17 is a drawing depicting an exemplary configuration of electronic indicators corresponding to a Status Indications control method in accordance with embodiments of the present invention.
Figure 18:
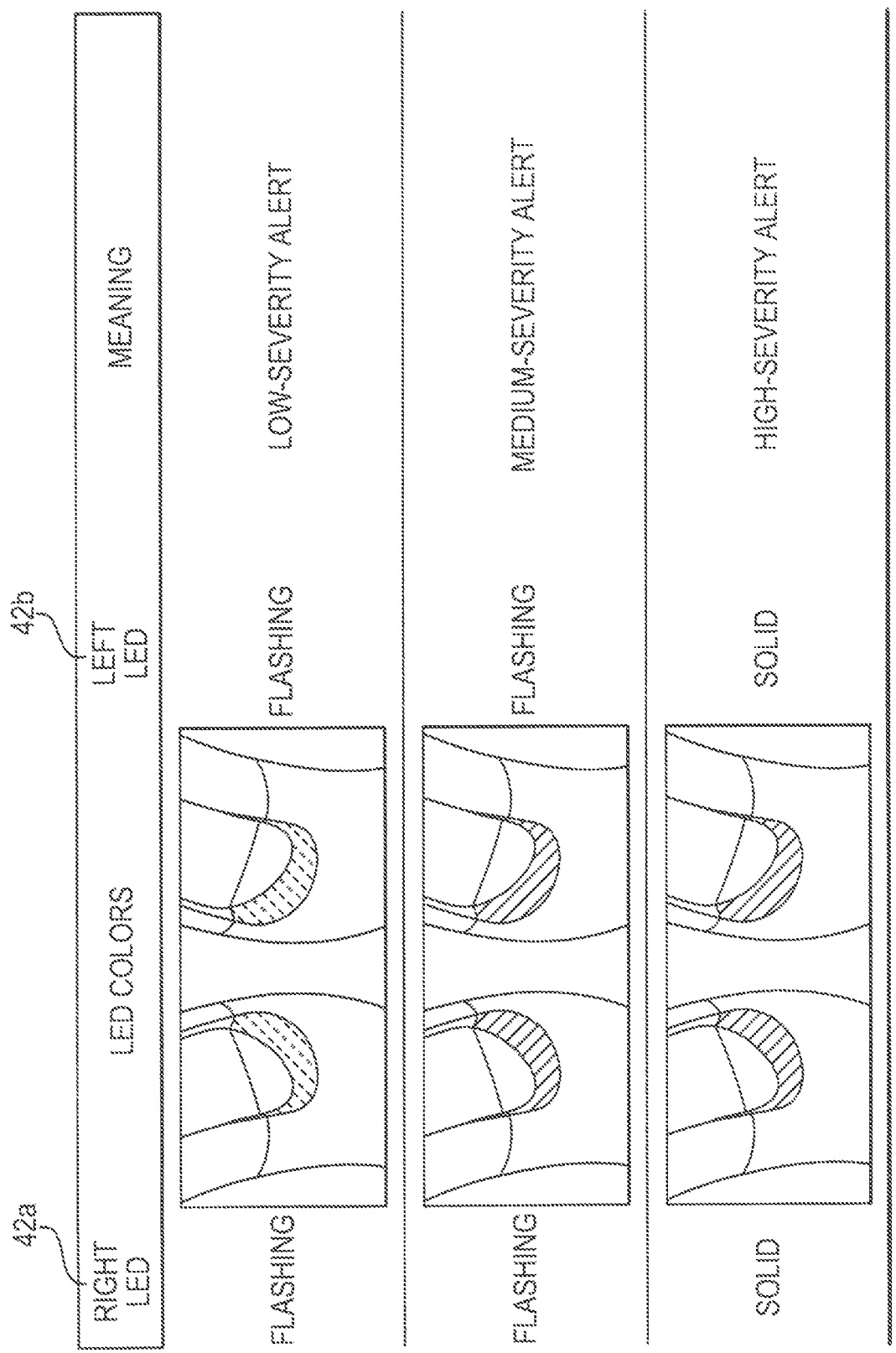
FIG. 18 is a drawing depicting an exemplary configuration of electronic indicators corresponding to a Device Alerts control method in accordance with embodiments of the present invention.

The following provides a description of various control methods for controlling the electronic indicators 40 that correspond to different device states and/or modes of operation of a mobility device. As an illustrative example, the mobility device is a legged mobility exoskeleton device. As referenced above, comparable principles may be employed in connection with control methods and related alerts for other types of mobility devices, such as for example more generally orthotic devices and prosthetic devices. FIGS. 16-18 in particular depict exemplary configurations of the electronic indicators in accordance with embodiments of the present invention. In the examples below, as corresponding to a mobility device comprising a legged mobility device, the electronic indicators 40 include a right side electronic indicator 40a including a right visual indicator 42a, and a left side electronic indicator 40b including a left visual indicator 42b.

In general, therefore, aspects of the invention are directed to enhanced methods of controlling a mobility device including at least one drive component that drives at least one joint component. Although the exemplary control methods are described below as a specific order of executing functional logic steps, the order of executing the steps may be changed relative to the order described. Also, two or more steps described in succession may be executed concurrently or with partial concurrence. It is understood that all such variations are within the scope of the present invention.

The control method may include the steps of: providing said mobility device, said mobility device further including an electronic controller for controlling operation of the at least one drive component to selectively configure and modulate the at least one joint component; providing within said mobility device a control application to be executed by the electronic controller; providing within said mobility device a plurality of sensors to detect a state of the at least one drive component and/or the at least one joint component; providing within said mobility device a plurality of electronic indicators; and executing the control application with the electronic controller. The controller may execute the control application to perform the steps of: receiving sensor information from the sensors corresponding to a state and/or mode of operation of the mobility device; analyzing the sensor information and determining a control mode of operation based on the sensor information; generating a control signal to output an alert via the electronic indicators corresponding to the determined control mode of operation; and controlling the at least one drive component of the mobility device to selectively configure and modulate the at least one joint component in accordance with the determined control mode of operation.

The following describes mobility device operation in accordance with certain examples of control modes of operation. In exemplary embodiments, the control modes of operation may include a Device Standby control mode, a Status Indications control mode, and various Device Alerts control modes. The Device Alerts control modes, for example, may include various Safety Alerts modes such as for example a Thermal Protection control mode and a Sensor Faults control mode. It will be appreciated that these various control modes are examples, and other control modes may be employed in accordance with the principles of the present invention. FIGS. 16-18 show various configurations of the visual indicators as associated with different device states and control modes of operation. For variations of device state and mode, different colors may be emitted by the visual indicators. The different colors are denoted in the drawings by different fill patterns for the visual indicators. It will be appreciated that with different colors different information may be conveyed, but any suitable colors may be used and the colors identified in the description below are examples.

Generally, the Device Standby control mode may include: receiving sensor information corresponding to whether the mobility device is in a standby state preventing transitions between mobility modes, and an active state permitting transitions between mobility modes; outputting information regarding the standby state or the active state via the electronic indicators; and controlling the mobility device in accordance with either the standby state or the active state. The Device Standby control mode further may include toggling between the standby state and the active state, which can prevent accidental state transitions that may result in user instability or a fall. FIG. 16 is a drawing depicting an exemplary configuration of the visual indicators 42a and 42b corresponding to the Device Standby control method. Since it is contemplated in this example that both visual indicators 42a and 42b will operate congruently in the Device Standby control method, only one such electronic indicator is depicted for each state for simplicity.

The exemplary embodiment related to Device Standby may include preventing unwanted transitions between the major mobility modes (e.g. stand, walk, sit) when the user manually puts the device into standby by operating the input interface, such as for example by using short presses of the power button after the device has been turned on. Unwanted transitions among other modes (e.g. stair climbing), or states within a given mode (e.g. left step, right step), may be prevented either additionally or alternatively to preventing transitions between the major mobility modes. Furthermore, device standby may occur automatically or in response to other stimulus. While conventional configurations described in the background section suggest restricting device state based on center of pressure variation, the device standby method described herein, in which standby is volitional or based on other criteria, is not taught by prior configurations.

As referenced above, the Device Standby control method is in part for toggling between standby and active device states after the exoskeleton device has been turned on and enabled. As seen in FIG. 16, two states including a "standby state" and an "active state" are shown. The standby state may be indicated by the visual (LED) indicators 42a/42b emitting light of a first or standby color. Similarly, the go state may be indicated by the visual (LED) indicators 42a/42b emitting light of a second or active color that is different from the first/standby color. For example, the standby color may be blue and the active color may be green, although any suitable colors may be employed. The electronic indicators further may include one or more haptic indicators that can provide a haptic or vibration feedback in response to postural cues of the user. An auditory cue also may be provided in response to the postural cues.

In the standby state, the exoskeleton device may respond to postural cues with vibration only, but a transition between mobility modes does not occur. In other words, the device sensors may read postural cues as to leg position, torso position, and the like, such postural cues being interpreted by the control system 20. The control system may output a control signal to cause the visual indicator to emit the standby color (e.g., blue) and further to emit a control signal to a haptic indicator, thereby causing a vibration, when the postural cues correspond to a position for mobility mode transition (e.g., sit to stand, stand to sit, stand to walk, walk to stand, or the like). In the standby mode, however, a transition between such mobility modes does not actually occur, meaning the current mode (e.g., sitting, standing) is maintained. The standby mode is useful for a user to practice achieving posture for transitioning the mobility mode, insofar as haptic indication is triggered without actual mode transition. In this manner, a user can become accustomed to transitioning postures knowing that the device will not actually reconfigure and transition.

In the active state, the exoskeleton device may respond to postural cues with vibration followed by the actual transition from a current mobility mode to a next mobility mode. The control system may output a control signal to cause the visual indicator to emit the active color (e.g., green), to emit a control signal to a haptic indicator, thereby causing a vibration, when the postural cues correspond to a position for mode transition (again, e.g., sit to stand, stand to sit, stand to walk, walk to stand, or the like), and then further to emit a control signal to one or more drive components of the exoskeleton device to actuate the mode transition in accordance with the postural cues of the user. In the active mode, therefore, a transition from a current mobility mode (e.g., sitting; e.g., standing) to a next mobility mode (e.g., standing; e.g., walking) will occur. Essentially, therefore, in the active mode full device functioning may be performed, insofar as a user may fully transition between mobility modes by achieving the requisite postural cues.

A user may toggle between the standby and active states by applying an input to the input interface. In other words, the sensor information related to toggling between the standby and active states may be receiving a user input to the input interface. When the input interface receives such an input, the control system will emit a control signal to the visual indicator to change as warranted between the first/standby color and the second/active color. The control system then will control the exoskeleton device to operate in accordance with either the standby state or active state, whichever is the current state, in the manner described above. In exemplary embodiments, the exoskeleton device may be toggled between the standby and active states by receiving a brief depression of the power button after the device has been turned on and enabled. Another option may be to have a dedicated state toggle button as one of the control inputs 48.

Status Indications is a control method by which device status is communicated or made known to the user with the electronic indicators. Generally, the Status Indications control mode may include: receiving sensor information corresponding to a status of the mobility device; outputting information regarding the status of the mobility device via the electronic indicators; and controlling the mobility device in accordance with the status of the mobility device. FIG. 17 is a drawing depicting an exemplary configuration of the visual indicators 42a and 42b corresponding to the Status Indications control method. Since it is contemplated in this example that the visual indicators 42a and 42b may operate independently in the Status Indications control method, corresponding to differences in left side versus right side operations, both electronic indicators are depicted for the various features of the Status Indications control method.

The exemplary embodiment related to Status Indications may include visual indications for communicating an array of states of the exoskeleton device. The visual indicators may output different colors corresponding to different mobility device statuses. Such statuses may include, for example, wireless connectivity status, device standby or active state status, mobility mode status, and next step status, although other indications may be included. Similarly as depicted in FIG. 16, the top portion of the table in FIG. 17 depicts that the standby state may be indicated by the right and/or left side visual indicators 42a and 42b emitting light of the first/standby color, which as indicated in the figure optionally by be emitted as solid or flashing light. For example, the first/standby color as referenced above may be configured as blue lights on both left and right side visual indicators 42a and 42b that are solid lights or flashing lights to indicate that the exoskeleton device is in the standby state. The visual indications further may be accompanied by corresponding haptic and/or audio alert indications.

The middle portion of the table of FIG. 17 indicates different configurations of the visual indicators corresponding to exemplary features of the active state. Similarly as depicted in FIG. 16, the middle portion of the table in FIG. 17 depicts that the active state may be indicated by the right and/or left side visual indicators 42a and 42b emitting light of the second/active color. As further shown in FIG. 17, combinations of solid versus flashing operation of the visual indicators in the second/active color may be employed to indicate more specific sub-states within the active state. For example, the second/active color as referenced above may be configured as green lights on both left and right side visual indicators 42a and 42b.

To denote different sub-states within the active states, different combinations of solid versus flashing lights of the active color may be employed. In the example of FIG. 17, two solid light indications from the visual indicators 42a and 42b may indicate that the device is in the active state but stationary. Such indication may correspond, for example, to a sitting or standing mode, in which the device is awaiting postural cues for a mode transition. Upon the user achieving the postural cues, in the active state the haptic indicator will vibrate and the mode transition will proceed. The other combinations shown in the middle portion of FIG. 17 may corresponding to different stepping operations in a walking mode, including indications of which leg will step next. For example, a flashing light from the left side visual indicator 42a with a solid light from the right side visual indicator 42b may be used to indicate that the left leg will step next. Comparably, a flashing light from the right side visual indicator 42b with a solid light from the left side visual indicator 42a may be used to indicate that the right leg will step next. As another example shown in the bottom portion of FIG. 17, a fast-flashing light from the left side visual indicator 42a with a solid light from the right side visual indicator 42b may be used to indicate that the left leg will next perform a half-step to return to the standing mode. Comparably, a fast-flashing light from the right side visual indicator 42b with a solid light from the left side visual indicator 42a may be used to indicate that the right leg will next perform a half-step to return to the standing mode. Other combinations of light emissions from the visual indicators 42a and 42b may be employed to denote sub-states of the active states as warranted. While conventional configurations described in the background section suggest communicating device states or future actions to the user, the status indication method described herein, in which states, actions and their method of communication are well defined for specific sub-states, is not taught by prior configurations.

Device Alerts is a control method by which device performance issues are communicated or made known to the user with the electronic indicators. Generally, the Device Alerts control mode may include: receiving sensor information corresponding to a safety alert condition; outputting information regarding a safety alert condition via the electronic indicators; and controlling the mobility device in accordance with the safety alert condition. With different types of device alerts, particularly safety related device alerts, the Device Alerts control method further may include: categorizing a safety alert condition by a degree of severity; outputting the information regarding the safety alert condition depending upon the degree of severity; and controlling the mobility device in accordance with the degree of severity. FIG. 18 is a drawing depicting an exemplary configuration of the visual indicators 42a and 42b corresponding to the Device Alerts control method. Since it is contemplated in this example that the visual indicators 42a and 42b may operate independently in the Device Alerts control method, corresponding to differences in left side versus right side operations, both electronic indicators are depicted for the various features of the Status Indications control method.

As referenced above, "Alerts" in the context of the current invention has a specific meaning as understood by those of ordinary skill in the art. Within the context of the safety features described herein, alerts have the following three criteria: (1) alerts are associated with a hazard as to which the user may otherwise be unaware of, (2) as to which a user can perform a specific action to resolve, and (3) are accompanied by solid or flashing LEDs in exemplary alert color schemes. Indications that do not meet these criteria are not considered alerts. For instance, if someone is falling, they are likely (1) aware of the situation, (2) cannot take specific action to resolve the situation, and (3) would not be paying attention to any alert indicator, and thus falling indications actually would not constitute an "alert" in the context. Accordingly, indications that do not meet the three above criteria generally are not considered safety "alerts" in this context.

There may be varying device performance issues as to which the Device Alerts control method may be employed. Generally, a given performance issue may be categorized by severity, with a different configuration of visual indicators being present for different levels of severity. The Device Alerts indications may be combined with the other indications described above, so as to provide a combined indication of both the operational state of the exoskeleton device and any current performance issues.

In a general paradigm for the treatment of different categories of Device Alerts, when the safety alert condition is categorized to have a degree of severity corresponding to a low level safety alert condition, the electronic controller controls the at least one drive component to drive the at least one joint component in accordance with normal operation of the mobility device. When a safety alert condition is categorized to have a degree of severity corresponding to a medium level safety alert condition, the electronic controller controls the at least one drive component to drive the at least one joint component to limit torque to the at least one joint component, which may include limiting transitions between mobility modes. When a safety alert condition is categorized to have a degree of severity corresponding to a severe safety alert condition, the electronic controller controls the at least one drive component to drive the at least one joint component to limit torque to prevent movement of the at least one joint component. Variations on the above and intermediate or fine control also may be employed depending on the precise nature and circumstances of a safety alert condition.

Examples of alerts are described in the following non-limiting examples, and other types of device alerts may be indicated and combined with related device control as warranted.

Device Alerts for Thermal Protection is a control method whereby the safety alert condition is an elevated temperature of the mobility device above a range of normal operating temperature. In this control method, elevated temperatures are detected and utilized to modify device behavior to better protect the user and exoskeleton device components should elevated temperatures occur. In exemplary embodiments, the Thermal Protection control mode may include: categorizing a safety alert condition by a degree of severity based on a degree of temperature elevation above the normal operating temperature; outputting a safety alert indication depending upon the degree of temperature elevation; and controlling the mobility device in accordance with the degree of temperature elevation.

Exemplary embodiments related to Thermal Protection may include limiting commanded current or torque in proportion to temperature levels as the temperature elevates above normal operating temperature, either incrementally, continuously or in stages, such that continued temperature increase is less likely. Beyond a certain first temperature threshold, mobility mode transitions may be limited. For example, the sit-to-stand (standing) and step-to-step (walking) transitions are disallowed, meaning that the user may only stand from walking, or sit from standing, to allow the actuators to cool. For enhanced safety, these effects may not be immediate. For example, the user must come to a stand or sit before current levels are correspondingly reduced to prevent disruption of a transition that is occurring and not yet complete. Beyond a certain higher second temperature threshold, all motion may be prohibited, although a minimal level of current still may be available to provide some level of support. In exemplary embodiments, as a non-limiting numerical example an initial elevated temperature alert may be provided at about 90°-100° F., although this initial level may not be associated with any device limitations. At a level of about 110° F., some limiting of torque may begin to be applied. The first predetermined threshold for limiting mobility mode transitions may be at about 120° F., and the second predetermined threshold for prohibiting joint motion may be at about 130° F. The thermal protection method described herein, in which temperatures affect device behavior in general, is not taught by prior configurations.

Device Alerts for Sensor Faults is a control method whereby the safety alert condition is a sensor fault by which sensor issues are detected and utilized to modify device behavior to better protect the user and exoskeleton device components should sensor faults occur. In exemplary embodiments, the Sensor Faults control mode may include: categorizing a safety alert condition by a degree of severity based on a characteristic of a sensor fault; outputting a safety alert indication depending upon the degree of severity of the sensor fault; and controlling the mobility device in accordance with the degree of severity of the sensor fault.

The exemplary embodiment related to the Sensor Faults control mode may include preventing further mobility mode transitions or joint movement in response to when a sensor fault has been detected. The device mobility control to limit mobility transitions or prevent joint movement may be implemented after a predetermined time period or the device has reached a stable state, timed out, or ceased moving after the sensor fault. For example, if a faulty position sensor signal is detected while standing, further mode transitions may be prevented as soon as the standing mode is achieved. Alternatively, joint motion may cease immediately upon certain circumstances of fault detection. In such a case position references may be held constant, gains would be reduced, and commanded current would saturate at lower values as soon as the fault occurs. In connection with the example sensors referenced above, the sensor fault may include one or more of a hall effect sensor error, magnetic angle sensor error, accelerometer sensor error, gyroscope sensor error, or resistance temperature detector error, or others. The mobility device also may include redundant sensors for one or more respective sensors of the referenced sensors, and the redundant sensors may provide alert information in response to a sensor fault detected in a respective sensor. The sensor faults method described herein, in which faults effect device behavior in general, is not taught by prior configurations.

In another exemplary embodiment of a device alert control method, the safety alert condition may be a reduced battery level. The control method further may include categorizing the safety alert condition by a degree of severity based on a degree of reduced battery level; outputting the safety alert indication depending upon the degree of reduced battery level; and controlling the mobility device in accordance with the degree of reduced battery level. The device may perform an intelligent calculation of battery level for accurate calculation of true batter capacity based on particular circumstances or conditions of use. In exemplary embodiments, a medium severity alert, for example, may be set at 15% battery level, and a severe safety alert may be set at 5% battery level. This control method may include preventing further mobility mode transitions or joint movement in response to when a reduced battery level has been detected. Similarly to other control methods, the device mobility control to limit mobility transitions or prevent joint movement based on battery level may be implemented after a predetermined time period or the device has reached a stable state, timed out, or ceased moving after the reduced battery level is detected.

More generally, Device Alerts for Safety Alerts is a control method by which potential hazards are grouped according to severity, and result in similar specific device indications and behaviors. In the exemplary embodiment related to Safety Alerts, alerts for example may be issued in response to reduced battery levels, elevated motor temperatures, or in the presence of sensor faults. These alerts may be grouped according to severity and resulting device behavior. Different levels of alert severity may correspond to different light indicator emissions from the electronic indicators 40a and 40b via their respective visual indicators 42a and 42b. Example configurations for the indicators corresponding to different alerts are depicted in FIG. 18. The alert indication is significant because the performance issue corresponding to the alert may effect a difference in device operation, as to which the user should be aware for enhanced safety.

The top portion of FIG. 18 is an example corresponding to a configuration of the visual indicators for a low severity alert category. In this example, for a low severity alert the visual indicators 42a and 42b may emit light of a third or caution color. For example, yellow may be the third/caution color. In exemplary embodiments, a modestly low battery lever or a temperature elevation slightly above-normal operating temperature may be considered a low-severity alert. In the example of the top portion of FIG. 18, a low-level severity alert may be indicated by the visual indicators 42a and 42b emitting a flashing light of the third/caution color. Accordingly, the example of the top portion of FIG. 18 may correspond to the device battery moderately low and/or internal temperatures are beginning to increase.

The low severity alerts also may be combined with the other mode and state alerts described above for more detailed indications pertaining to device operation. For example, if either or both visual indicators flash between the standby color (blue) and the caution color (yellow), the exoskeleton device is in the standby state and will only vibrate in response to postural cues and not transition between modes. If either or both visual indicators flash between the active color (green) and the caution color (yellow), the device is in the active state and will respond to postural cues with mode transitions. A visual indicator flashing only the caution color (yellow) may indicate that the respective leg that will take the next step. By the low-severity alert users should be aware that continued use will drain the battery further and/or may cause internal temperatures to increase to more critical levels. As a low-severity condition, there may not be any changes to device performance.

The middle portion of FIG. 18 is an example corresponding to a configuration of the visual indicators for a medium-severity alert category. In this example, for a medium-severity alert the visual indicators 42a and 42b may emit light of a fourth or warning color. For example, red may be the fourth/warning color. In exemplary embodiments, a very low battery lever or a temperature elevation highly above-normal operating temperature may be considered a medium-severity alert. In the example of the middle portion of FIG. 18, a medium-level severity alert may be indicated by the visual indicators 42a and 42b emitting a flashing light of the fourth/warning color. Accordingly, the example of the middle portion of FIG. 18 may correspond to the device battery being very low and/or high internal temperatures.

Similarly to the above, the medium-severity alerts also may be combined with the other mode and state alerts described above for more detailed indications pertaining to device operation. For example, if either or both visual indicators flash between the standby color (blue) and the warning color (red), the exoskeleton device is in the standby state and will only vibrate in response to postural cues and not transition between modes. If either or both visual indicators flash between the active color (green) and the warning color (red), the device is in the active state and may respond to postural cues with mode transitions. A visual indicator flashing only the warning color (red) may indicate that the respective leg that will take the next step.

In contrast to be low-severity alerts, a medium-severity alert condition further may trigger operative limitations of the exoskeleton device. Such operative limitations may be effected by the control system 20 acting on the drive components of the exoskeleton device. For example, in response to the medium-severity alert, the exoskeleton device may no longer permit walking mode or a sit-to-stand mode transition. Users may complete a half step to return to stand mode from walking mode, and perform stand-to-sit mode transitions only. The medium severity alert thus informs the user of a performance deficiency of medium severity, and with the device operative limitations, users are made aware that they should find a place to sit down and power off the device, and check the battery level and recharge if necessary. Users further are made aware that continued use will drain the battery further and may result in power loss or cause internal temperatures to increase to more critical levels.

In exemplary embodiments, for medium severity alerts (or greater, e.g., high severity alerts), two different software suites may be employed. A Motion software suite may correspond to users who essentially lack any mobile capabilities, such as may be the case for severe spinal injuries. In the Motion software suite, a suitable response would be joint lockup and device lockout. Because users of the Motion software suite tend to be unable to support themselves at all, the joint lockup results in rigidity of the device to support the user and reduce the likelihood of an injurious fall. A Therapy software suite may correspond to users who retain some, although limited, capabilities of support and motion, such as may be the case for those who have experienced a cerebrovascular accident (e.g., stroke). In the Therapy software suite, a suitable response would be for the joints to go limp rather than locking. Because users of the Therapy software suite tend to be able to support themselves to a feasible degree, the limp joints result in the device not interfering with the user's response to support themselves.

The lower portion of FIG. 18 is an example corresponding to a configuration of the visual indicators for a high-severity alert category. In this example, for a high-severity alert the visual indicators 42a and 42b may emit solid light of the fourth/warning color. In exemplary embodiments, high-severity alerts may include a critically low battery level, a temperature elevation critically above-normal operating temperature, a critical sensor fault, and a battery charger being detected as connected to the exoskeleton device while the device is in use. A high severity alert condition may trigger substantive operative limitations of the exoskeleton device. Such operative limitations again may be effected by the control system 20 acting on the drive components of the exoskeleton device.

A high severity alert may result in device limitations corresponding to the Motion software suite and Therapy software suite as referenced above. For example, for the Motion software suite response to the high-severity alert, the exoskeleton device may lockup the joints in its present configuration at the time of the alert. For the Therapy software suite response to the high-severity alert, the exoskeleton device may control the joints to go limp at the time of the alert. Any joints that have reaches a critical temperature otherwise may be disabled. The high-severity alert thus informs the user of a performance deficiency of high severity, and with the substantial device operative limitations, users are made aware that they should cease use of the device immediately and power off the device. If the high-severity alert stemmed from the charger being detected as connected to the exoskeleton device, a user may unplug the charger before turning the device back on. Other high-severity alerts would provide notice to the user to obtain qualified servicing of the exoskeleton device.

Considering the above description, alerts of similar severity can be associated with the same indication and device behavior, even if the alert cause differs. Such an alert scheme, wherein low and medium severity alerts involve flashing lights, still allows the indications to be visible even during otherwise normal use. When coupled with the operative limitations imposed on the exoskeleton device, enhanced user safety is achieved along with reduced propensity for device damage. The user can then perform any remedial operations, for example, whether merely letting the device cool down or recharging the battery (e.g., medium-severity alerts), or ceasing operation of the exoskeleton device and potentially seeking qualified servicing (high severity alerts). While conventional configurations described in the background section suggest alert schemes, the events which trigger the conventional alerts are either significantly different, overly ambiguous, or not associated with changes in exoskeleton device behavior, which all are in contrast to the present invention. The Device Alerts control method described herein, in which potential hazards are grouped according to severity for comparable indication, and result in comparable specific operative device indications and behaviors is not taught by prior configurations.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of controlling a mobility device including at least one drive component that drives at least one joint component, the control method comprising the steps of:

providing said mobility device, said mobility device further including an electronic controller for controlling operation of the at least one drive component to selectively control the at least one joint component;

storing, within said electronic controller, a control application to be executed by the electronic controller;

providing, on said mobility device, a plurality of sensors to detect a state of the at least one drive component and/or the at least one joint component;

providing, on said mobility device, a plurality of electronic indicators; and wherein the electronic controller executes the control application to perform the steps of:

receiving sensor information from the sensors corresponding to operation of the mobility device;

analyzing the sensor information and determining a control mode of operation based on the sensor information;

generating a control signal to control the electronic indicators to output a visual alert that is visible to a user of the mobility device, the visual alert corresponding to the determined control mode of operation; and controlling the at least one drive component of the mobility device to selectively control the at least one joint component in accordance with the determined control mode of operation;

wherein when the electronic controller determines that the control mode of operation is a device alerts control mode, the electronic controller further executes the control application to perform the steps of:

receiving the sensor information from the sensors corresponding to the operation of the mobility device and further corresponding to a safety alert condition regarding said operation of the mobility device, the safety alert condition comprising a condition corresponding to a hazard as to which the user of the mobility device may not be aware and as to which the user can perform a specific action to resolve the safety alert condition in response to an alert of the safety alert condition;

categorizing the safety alert condition by a degree of severity of the hazard;

controlling the electronic indicators to output the visual alert to indicate the degree of severity of the safety alert condition; and controlling the mobility device in accordance with the degree of severity, by controlling an amount of torque applied by the drive component to the at least one joint component and the amount of torque is based upon the degree of severity;

wherein:

when the electronic controller categorizes the safety alert condition as a first level safety alert condition having a first degree of severity of the hazard, the electronic controller controls the at least one drive component to drive the at least one joint component in accordance with one or more modes of sitting, standing, walking, and transitions between modes of sitting, standing, or walking, else the plurality of sensors continue to detect the state of the at least one drive component and/or the at least one joint component; and when the electronic controller categorizes the safety alert condition to have a second degree of severity of the hazard greater than the first degree of severity corresponding to a medium level safety alert condition, the electronic controller controls the at least one drive component to drive the at least one joint component to limit torque to the at least one joint component so as to limit transitions between standing, walking, and sitting, else the plurality of sensors continue to detect the state of the at least one drive component and/or the at least one joint component.

2. The control method of claim 1, wherein when the electronic controller determines that the control mode of operation is a device standby control mode, the electronic controller further executes the control application to perform the steps of:

receiving the sensor information from the sensors and determining whether the mobility device is in a standby state that prevents transitions between mobility modes, the mobility modes including standing, walking, and sitting, or an active state that permits transitions between mobility modes;

controlling the electronic indicators to output the visual alert that is visible to the user of the mobility device to indicate whether the mobility device is in the standby state or the active state; and controlling the mobility device in accordance with either the standby state or the active state as determined based on the sensor information.

3. The control method of claim 1, when the electronic controller categorizes the safety alert condition to have the first degree of severity corresponding to the first level safety alert condition, the electronic controller controls the electronic indicators to output the visual alert having a first configuration that is visible to the user.

4. The control method of claim 3, when the electronic controller categorizes the safety alert condition as the medium level safety alert condition, the electronic controller controls the electronic indicators to output the visual alert having a second configuration different from the first configuration that is visible to the user.

5. The control method of claim 1, wherein when the electronic controller categorizes a safety alert condition to have a third degree of severity of the hazard greater than the second degree of severity corresponding to a severe safety alert condition, the electronic controller controls the at least one drive component to limit torque to prevent movement of the at least one joint component, else the plurality of sensors continue to detect the state of the at least one drive component and/or the at least one joint component.

6. The control method of claim 5, wherein when the electronic controller categorizes the safety alert condition as the severe safety alert condition the electronic controller controls the electronic indicators to output the visual alert having a third configuration different from the first and second configurations that is visible to the user.

7. The control method of claim 1, wherein the mobility device is a legged mobility exoskeleton device, and the at least one drive component that drives at least one joint component comprises a plurality of drive components that drive a plurality of joint components including at least knee joint components and hip joint components.

8. A non-transitory computer readable medium storing program code for a control application for use in controlling a mobility device including at least one drive component that drives at least one joint component;

wherein the mobility device comprises: an electronic controller for controlling operation of the at least one drive component to selectively configure and modulate the at least one joint component; a plurality of sensors to detect a state of the at least one drive component and/or the at least one joint component; and a plurality of electronic indicators; and the electronic controller executes the program code to perform the steps of:

receiving sensor information from the sensors corresponding to operation of the mobility device;

analyzing the sensor information and determining a control mode of operation based on the sensor information;

generating a control signal to control the electronic indicators to output a visual alert that is visible to a user of the mobility device, the visual alert corresponding to the determined control mode of operation; and controlling the at least one drive component of the mobility device to selectively control the at least one joint component in accordance with the determined control mode of operation;

wherein when the electronic controller determines that the control mode of operation is a device alerts control mode, the electronic controller further executes the program code to perform the steps of:

receiving the sensor information from the sensors corresponding to the operation of the mobility device and further corresponding to a safety alert condition regarding said operation of the mobility device, the safety alert condition comprising a condition corresponding to a hazard as to which the user of the mobility device may not be aware and as to which the user can perform a specific action to resolve the safety alert condition in response to an alert of the safety alert condition;

categorizing the safety alert condition by a degree of severity of the hazard;

controlling the electronic indicators to output the visual alert to indicate the degree of severity of the safety alert condition; and controlling the mobility device in accordance with the degree of severity, by controlling an amount of torque applied by the drive component to the at least one joint component and the amount of torque is based upon the degree of severity;

wherein:

when the electronic controller categorizes the safety alert condition as a first level safety alert condition having a first degree of severity of the hazard, the electronic controller controls the at least one drive component to drive the at least one joint component in accordance with one or more modes of sitting, standing, walking, and transitions between modes of sitting, standing, or walking, else the plurality of sensors continue to detect the state of the at least one drive component and/or the at least one joint component; and when the electronic controller categorizes the safety alert condition to have a second degree of severity of the hazard greater than the first degree of severity corresponding to a medium level safety alert condition, the electronic controller controls the at least one drive component to drive the at least one joint component to limit torque to the at least one joint component so as to limit transitions between standing, walking, and sitting, else the plurality of sensors continue to detect the state of the at least one drive component and/or the at least one joint component.

9. The non-transitory computer readable medium of claim 8, wherein when the electronic controller categorizes a safety alert condition to have a third degree of severity of the hazard greater than the second degree of severity corresponding to a severe safety alert condition, the electronic controller controls the at least one drive component to limit torque to prevent movement of the at least one joint component, else the plurality of sensors continue to detect the state of the at least one drive component and/or the at least one joint component.

10. A mobility device comprising:
- an electronic controller for controlling operation of at least one drive component to selectively control at least one joint component;
- a plurality of sensors to detect a state of the at least one drive component and/or the at least one joint component;
- a plurality of electronic indicators; and
- the non-transitory computer readable medium according to claim 8, wherein the electronic controller executes the program code stored on the non-transitory computer readable medium.

11. The mobility device of claim 10, wherein the mobility device is a legged mobility exoskeleton device comprising a plurality of drive components that drive a plurality of joint components including at least knee joint components and hip joint components.

* * * * *